(12) United States Patent
Cleary et al.

(10) Patent No.: US 11,951,713 B2
(45) Date of Patent: Apr. 9, 2024

(54) GLASS WITH UNIQUE FRACTURE BEHAVIOR FOR VEHICLE WINDSHIELD

(71) Applicant: CORNING INCORPORATED, Corning, NY (US)

(72) Inventors: Thomas Michael Cleary, Elmira, NY (US); Timothy Michael Gross, Corning, NY (US); Jingshi Wu, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 180 days.

(21) Appl. No.: 17/363,266

(22) Filed: Jun. 30, 2021

(65) Prior Publication Data

US 2022/0184926 A1 Jun. 16, 2022

Related U.S. Application Data

(60) Provisional application No. 63/183,271, filed on May 3, 2021, provisional application No. 63/183,292, filed
(Continued)

(51) Int. Cl.
*B32B 17/10* (2006.01)
*C03C 3/091* (2006.01)
(Continued)

(52) U.S. Cl.
CPC .. *B32B 17/10119* (2013.01); *B32B 17/10036* (2013.01); *B32B 17/10137* (2013.01); *B32B 17/10761* (2013.01); *C03C 3/091* (2013.01); *C03C 3/097* (2013.01); *C03C 4/18* (2013.01); *B32B 2250/03* (2013.01); *B32B 2250/40* (2013.01); *B32B 2315/08* (2013.01);
(Continued)

(58) Field of Classification Search
CPC ......... B32B 17/10119; B32B 17/10137; B32B 17/10761; B32B 17/10036; B32B 2250/03; B32B 2250/40; B32B 2315/08; B32B 2329/06; B32B 2605/08; B32B 2605/006; C03C 4/18; C03C 2204/00
See application file for complete search history.

(56) References Cited

U.S. PATENT DOCUMENTS 1,623,301 A 4/1927 Brenner
3,640,738 A 2/1972 Detweiler, Jr. et al.
(Continued)

FOREIGN PATENT DOCUMENTS

CN 101213150 B 9/2011
CN 109052935 A 12/2018
(Continued)

OTHER PUBLICATIONS

Gross et al., "Crack-resistant glass with high shear band density", In Journal of Non-Crystalline Solids, vol. 494, 2018, pp. 13-20.
(Continued)

*Primary Examiner* — Laura A Auer
(74) *Attorney, Agent, or Firm* — William M. Johnson; Russell Scott Magaziner

(57) ABSTRACT

Disclosed herein are embodiments of a borosilicate glass composition as may be useful for windshield and other applications in particular due to unique fracture behavior.

22 Claims, 17 Drawing Sheets

Related U.S. Application Data on May 3, 2021, provisional application No. 63/123,863, filed on Dec. 10, 2020.

(51) Int. Cl.
   *C03C 3/097* (2006.01)
   *C03C 4/08* (2006.01)
   *C03C 4/18* (2006.01)

(52) U.S. Cl.
   CPC ..... *B32B 2329/06* (2013.01); *B32B 2605/006* (2013.01); *B32B 2605/08* (2013.01); *C03C 2204/00* (2013.01)

(56) References Cited

U.S. PATENT DOCUMENTS

| | | |
|---|---|---|
| 4,259,118 A | 3/1981 | Sack |
| 4,298,389 A | 11/1981 | Johnson et al. |
| 4,565,791 A | 1/1986 | Boudot et al. |
| 4,870,034 A | 9/1989 | Kiefer |
| 5,292,690 A | 3/1994 | Kawachi et al. |
| 5,591,683 A | 1/1997 | Stempin et al. |
| 5,605,869 A | 2/1997 | Mangat et al. |
| 5,633,090 A | 5/1997 | Rodek et al. |
| 5,656,558 A | 8/1997 | Brix et al. |
| 5,747,399 A | 5/1998 | Kosokabe et al. |
| 5,763,343 A | 6/1998 | Brix et al. |
| 5,858,897 A | 1/1999 | Maeda et al. |
| 6,204,212 B1 | 3/2001 | Kunert et al. |
| 6,284,686 B1 | 9/2001 | Marlor |
| 6,297,182 B1 | 10/2001 | Maeda et al. |
| 6,313,052 B1 | 11/2001 | Nakashima et al. |
| 6,500,778 B1 | 12/2002 | Maeda et al. |
| 6,794,323 B2 | 9/2004 | Peuchert et al. |
| 7,462,411 B2 | 12/2008 | Ikenishi et al. |
| 7,595,273 B2 | 9/2009 | Ikenishi et al. |
| 7,760,977 B2 | 7/2010 | Curdt et al. |
| 7,767,607 B2 | 8/2010 | Kurachi et al. |
| 7,803,472 B2 | 9/2010 | Nagai et al. |
| 7,892,999 B2 | 2/2011 | Nagai et al. |
| 8,168,313 B2 | 5/2012 | Endo et al. |
| 8,283,269 B2 | 10/2012 | Fechner et al. |
| 8,349,454 B2 | 1/2013 | Murata et al. |
| 8,349,751 B2 | 1/2013 | Nagai et al. |
| 8,394,516 B2 | 3/2013 | Matsumoto et al. |
| 8,563,149 B2 | 10/2013 | Nagashima et al. |
| 8,652,979 B2 | 2/2014 | Murata |
| 8,697,592 B2 | 4/2014 | Ikenishi et al. |
| 8,715,829 B2 | 5/2014 | Akiba et al. |
| 8,791,036 B2 | 7/2014 | Tsujimura et al. |
| 8,916,487 B2 | 12/2014 | Kawai et al. |
| 9,007,878 B2 | 4/2015 | Matsumoto et al. |
| 9,120,697 B2 | 9/2015 | Fiorentini et al. |
| 9,831,392 B2 | 11/2017 | Shiratori et al. |
| 10,307,992 B2 | 6/2019 | Lestringant et al. |
| 11,028,008 B2 | 6/2021 | Gross et al. |
| 2002/0147102 A1 | 10/2002 | Yamazaki et al. |
| 2007/0213195 A1 | 9/2007 | Hikata et al. |
| 2009/0023575 A1 | 1/2009 | Fujita et al. |
| 2009/0141478 A1 | 6/2009 | Niguma et al. |
| 2010/0093510 A1 | 4/2010 | Tanaka et al. |
| 2012/0141804 A1 | 6/2012 | Miyabe et al. |
| 2013/0225389 A1 | 8/2013 | Dick et al. |
| 2013/0302617 A1 | 11/2013 | Akiba et al. |
| 2013/0306145 A1 | 11/2013 | Hanawa et al. |
| 2014/0011035 A1 | 1/2014 | Senshu et al. |
| 2015/0051061 A1* | 2/2015 | Kiczenski ............... C03C 3/091 501/69 |
| 2015/0068595 A1 | 3/2015 | Kuroiwa et al. |
| 2015/0166402 A1 | 6/2015 | Muguruma et al. |
| 2015/0368146 A1 | 12/2015 | Ellison et al. |
| 2016/0002103 A1 | 1/2016 | Wang et al. |
| 2016/0225396 A1 | 8/2016 | Shimojima |
| 2016/0276544 A1 | 9/2016 | Shiratori et al. |
| 2017/0183255 A1 | 6/2017 | Walther et al. |
| 2017/0283302 A1 | 10/2017 | Choju et al. |
| 2018/0154615 A1* | 6/2018 | Dohn ................ B32B 17/10091 |
| 2018/0237326 A1* | 8/2018 | Fredholm ......... B32B 17/10137 |
| 2019/0352217 A1 | 11/2019 | Autenschlger et al. |
| 2019/0382303 A1 | 12/2019 | Grimm et al. |
| 2020/0048139 A1 | 2/2020 | Schaut et al. |
| 2020/0317559 A1 | 10/2020 | Fan et al. |
| 2020/0407266 A1 | 12/2020 | Suzuki |
| 2021/0188696 A1 | 6/2021 | Grimm et al. |
| 2021/0221731 A1 | 7/2021 | Botu et al. |
| 2021/0276915 A1 | 9/2021 | Ritter et al. |
| 2022/0177353 A1* | 6/2022 | Krüger .................. C03C 4/0085 |
| 2022/0371940 A1 | 11/2022 | Suzuki et al. |
| 2023/0002270 A1 | 1/2023 | Lautenschlger et al. |
| 2023/0071964 A1 | 3/2023 | Li et al. |
| 2023/0083077 A1 | 3/2023 | Nagano |

FOREIGN PATENT DOCUMENTS

| | | |
|---|---|---|
| CN | 111542503 A | 8/2020 |
| CN | 111741933 A | 10/2020 |
| CN | 112694254 A | 4/2021 |
| CN | 113003933 A | 6/2021 |
| CN | 114423718 A | 4/2022 |
| CN | 114845965 A | 8/2022 |
| CN | 110498605 B | 2/2023 |
| CN | 115784609 A | 3/2023 |
| DE | 102012100233 B4 | 5/2014 |
| DE | 102018112070 A1 | 11/2019 |
| DE | 102020122220 A1 | 6/2021 |
| DE | 102022122843 A1 | 3/2023 |
| EP | 2796288 A1 | 10/2014 |
| EP | 3728151 A1 | 10/2020 |
| EP | 3569577 B1 | 8/2022 |
| EP | 4148025 A1 | 3/2023 |
| GB | 0782620 A | 9/1957 |
| GB | 1454335 A | 11/1976 |
| JP | 57-191253 A | 11/1982 |
| JP | 1286936 A | 11/1989 |
| JP | 9124338 A | 5/1997 |
| JP | 11180728 A | 7/1999 |
| JP | 11310433 A | 11/1999 |
| JP | 11335133 A | 12/1999 |
| JP | 2000-226233 A | 8/2000 |
| JP | 2001-180967 A | 7/2001 |
| JP | 2003-054984 A | 2/2003 |
| JP | 2003-292339 A | 10/2003 |
| JP | 2004-051473 A | 2/2004 |
| JP | 2005-089286 A | 4/2005 |
| JP | 2005-162600 A | 6/2005 |
| JP | 2005-255520 A | 9/2005 |
| JP | 2006-096594 A | 4/2006 |
| JP | 2006-137631 A | 6/2006 |
| JP | 2006-143523 A | 6/2006 |
| JP | 2006-344927 A | 12/2006 |
| JP | 4074731 B2 | 4/2008 |
| JP | 2008-115071 A | 5/2008 |
| JP | 4219343 B2 | 2/2009 |
| JP | 4953156 B2 | 6/2012 |
| JP | 2014-169209 A | 9/2014 |
| JP | 2015-231936 A | 12/2015 |
| JP | 6195941 B2 | 9/2017 |
| JP | 6414076 B2 | 10/2018 |
| JP | 2019-199399 A | 11/2019 |
| JP | 2021-098645 A | 7/2021 |
| JP | 7216102 B2 | 1/2023 |
| KR | 10-1825276 B1 | 2/2018 |
| KR | 10-2019-0132254 A | 11/2019 |
| KR | 10-2020-0101371 A | 8/2020 |
| KR | 10-2020-0123130 A | 10/2020 |
| KR | 10-2022-0147065 A | 11/2022 |
| SU | 394331 A1 | 8/1973 |
| SU | 482402 A1 | 8/1975 |
| SU | 521238 A1 | 7/1976 |
| SU | 562519 A1 | 6/1977 |
| SU | 863518 A1 | 9/1981 |
| TW | I641574 B | 11/2018 |
| TW | 202003407 A | 1/2020 |
| TW | I756114 B | 2/2022 |

(56) References Cited

FOREIGN PATENT DOCUMENTS

| WO | 98/49111 A1 | 11/1998 | | |
|----|----|----|----|----|
| WO | 2010/055891 A1 | 5/2010 | | |
| WO | 2011/025316 A2 | 3/2011 | | |
| WO | 2011/125316 A1 | 10/2011 | | |
| WO | 2012/017694 A1 | 2/2012 | | |
| WO | 2013/047246 A1 | 4/2013 | | |
| WO | 2014/139147 A1 | 9/2014 | | |
| WO | 2014/203481 A1 | 12/2014 | | |
| WO | 2015/029902 A1 | 3/2015 | | |
| WO | 2015/195435 A2 | 12/2015 | | |
| WO | 2017/070500 A1 | 4/2017 | | |
| WO | 2018/178883 A1 | 10/2018 | | |
| WO | WO-2018213210 A1 * | 11/2018 | ............ | B32B 17/06 |
| WO | 2019/038723 A1 | 2/2019 | | |
| WO | 2019/119341 A1 | 6/2019 | | |
| WO | 2019/130285 A1 | 7/2019 | | |
| WO | 2019/163491 A1 | 8/2019 | | |
| WO | 2019/181207 A1 | 9/2019 | | |
| WO | 2019/198363 A1 | 10/2019 | | |
| WO | 2021/070707 A1 | 4/2021 | | |
| WO | 2021/090631 A1 | 5/2021 | | |
| WO | 2021/102163 A1 | 5/2021 | | |
| WO | 2021/171761 A1 | 9/2021 | | |
| WO | 2021/238475 A1 | 12/2021 | | |
| WO | 2022/131274 A1 | 6/2022 | | |
| WO | 2022/145281 A1 | 7/2022 | | |
| WO | 2022/168964 A1 | 8/2022 | | |
| WO | 2023/276922 A1 | 1/2023 | | |

OTHER PUBLICATIONS

Gross, "Deformation and cracking behavior of glasses indented with diamond tips of various sharpness", In Journal of Non-Crystalline Solids, vol. 358, 2012, pp. 3445-3452.
Fujita K., "Crack resistance of glass on Vickers identation", Proc. Xth Intern.Congr.on Glass, Kyoto, 1974, No. 11, pp. 39-46.
Volf M.B., Technical Approach to Glass, 1990, pp. 320-324.
Espe W., Tekhnologiya Elektrovakuumnykh Materialov, Tom 2, Energiya, Moskva, 1968, pp. 21, 51-52.

* cited by examiner

GLASS WITH UNIQUE FRACTURE BEHAVIOR FOR VEHICLE WINDSHIELD

PRIORITY

This application claims the benefit of U.S. Application Nos. 63/123,863 filed Dec. 10, 2020 and 63/183,292 filed May 3, 2021, and 63/183,271 filed May 3, 2021, each of which is incorporated by reference herein in its entirety.

BACKGROUND

The disclosure relates to glass compositions and glass articles made therefrom, and more particularly to borosilicate glass compositions capable of being fusion formed at relatively large thicknesses and glass articles made therefrom.

Glass is used in windows due to its optical clarity and durability. Automotive and architectural windows may include a single glass ply or a laminate that includes two glass plies with an interlayer of a polymeric material disposed in between. For automotive applications in particular, there is a trend toward using laminates for improved fuel economy and/or impact performance. Certain laminate designs may utilize a thicker outer glass ply and a thin inner glass ply. For example, the thicker glass ply may be a soda-lime glass, which is susceptible to thermal shock and to cracking upon impact by, e.g., a rock or other debris thrown from a roadway. Accordingly, there is a need for improved glasses for use as a thicker outer glass ply in a laminate.

SUMMARY

According to an aspect, embodiments of the present disclosure relate to a borosilicate glass composition. Unless otherwise specified, the glass compositions disclosed herein are described in mole percent (mol %) as analyzed on an oxide basis. In one or more embodiments, the borosilicate glass composition includes at least 74 mol % $SiO_2$, at least 10 mol % $B_2O_3$, and $Al_2O_3$ in an amount such that sum of $SiO_2$, $B_2O_3$, and $Al_2O_3$ is at least 90 mol %. In one or more embodiments, the borosilicate glass composition has a liquidus viscosity of greater than 500 kP. In one or more embodiments, the borosilicate glass composition has a temperature at which a viscosity of the borosilicate glass composition is 200 P of 1725° C. or less.

According to another aspect, embodiments of the present disclosure relate to a glass ply. The glass ply has a first major surface and a second major surface opposite to the first major surface. The glass ply is made of one or more embodiments of the borosilicate glass composition as described herein.

According to still another aspect, embodiments of the present disclosure relate to a laminate. The laminate includes a first glass ply according to one or more embodiments of the glass ply described herein. The laminate also includes a second glass ply and an interlayer bonding the first glass ply to the second glass ply.

According to yet another aspect, embodiments of the present disclosure relate to an automotive glazing. The automotive glazing is made from the laminate according to the previously described laminate.

According to a further aspect, embodiments of the present disclosure relate to a vehicle. The vehicle includes a body defining an interior of the vehicle and at least one opening and the automotive glazing as described disposed in the at least one opening. In the vehicle, the second glass ply is arranged facing the interior of the vehicle, and the first glass ply faces an exterior of the vehicle. In one or more embodiments, the first glass ply is arranged facing the interior of the vehicle and the second glass ply faces an exterior of the vehicle.

According to still a further aspect, embodiments of the present disclosure relate to a method of forming a glass ply. The glass ply has a first major surface and a second major surface. In the method, a trough in an isopipe is overflowed with at least two streams of a borosilicate glass composition having a liquidus viscosity of greater than 500 kP and a temperature at which the viscosity of the glass composition is 200 P of less than 1725° C. In one or more embodiments, the borosilicate glass composition includes at least 74 mol % $SiO_2$ and at least 10 mol % of $B_2O_3$. Further, in one or more embodiments, the composition includes a combined amount of $SiO_2$, $B_2O_3$, and $Al_2O_3$ is at least 90 mol %. In one or more embodiments of the method, the at least two streams of the borosilicate glass composition are fused at a root of the isopipe to form the glass ply having a thickness of at least 2 mm between the first major surface and the second major surface.

According to yet another aspect, embodiments of the present disclosure relate to a glass ply. The glass ply has a first major surface and a second major surface opposite to the first major surface. The glass ply is made of a borosilicate glass composition. When the glass ply is subjected to a quasi-static 2 kgf indentation load with a Vickers tip, the glass ply exhibits a ring crack and a plurality of radial cracks, and each radial crack of the plurality of radial cracks is bounded by the ring crack.

According to still yet another aspect, embodiments of the present disclosure relate to a glass laminate. The glass laminate includes a first glass ply, a second glass ply, and an interlayer. The first glass ply has a first major surface and a second major surface opposite to the first major surface. The first glass ply is made of a borosilicate glass composition. The second glass ply has a third major surface and a fourth major surface opposite to the third major surface. The interlayer bonds the second major surface of the first glass ply to the third major surface of the second glass ply. The borosilicate glass composition includes at least 74 mol % $SiO_2$, at least 10 mol % $B_2O_3$, and $Al_2O_3$ in an amount such that sum of $SiO_2$, $B_2O_3$, and $Al_2O_3$ is at least 90 mol %.

According to a still further embodiment, embodiments of the present disclosure relate to a system including a sensor and a glass laminate. The glass laminate includes a first glass ply having a first major surface and a second major surface opposite to the first major surface. The first glass ply is made of a borosilicate glass composition. The glass laminate includes a second glass ply having a third major surface and a fourth major surface opposite to the third major surface. An interlayer bonds the second major surface of the first glass ply to the third major surface of the second glass ply. The borosilicate glass composition includes at least 74 mol % $SiO_2$, at least 10 mol % $B_2O_3$, and $Al_2O_3$ in an amount such that sum of $SiO_2$, $B_2O_3$, and $Al_2O_3$ is at least 90 mol %. The sensor is configured to receive, transmit, or both receive and transmit signals through the glass laminate, and the signals have a peak wavelength in a range of 400 nm to 750 nm or a range of 1500 nm or greater.

According to another aspect, embodiments of the present disclosure relate to a glass laminate. The glass laminate includes a first glass ply having a first major surface and a second major surface opposite to the first major surface. The first glass ply is a fusion-formed borosilicate glass composition. The glass laminate also includes a second glass ply having a third major surface and a fourth major surface opposite to the third major surface. Further, the glass laminate includes an interlayer bonding the second major surface of the first glass ply to the third major surface of the second glass ply. Transmission of ultraviolet light having a wavelength in a range of 300-380 nm through the glass laminate is 75% or less. Transmission of light in the visible spectrum through the glass laminate is 73% or more, and total solar transmission through the glass laminate is 61% or less.

According to another aspect, embodiments of the present disclosure relate to a glass composition made up of $SiO_2$ in an amount in a range from about 72 mol % to about 80 mol %, $Al_2O_3$ in an amount in a range from about 2.5 mol % to about 5 mol %, and $B_2O_3$ in an amount in a range from about 11.5 mol % to about 14.5 mol %. The glass composition has a liquidus viscosity of greater than 500 kP, and the glass composition has a temperature at which a viscosity of the borosilicate glass composition is 200 P of 1725° C. or less.

According to another aspect, embodiments of the present disclosure relate to a glass composition made up of 74 mol % to 80 mol % of $SiO_2$, 2.5 mol % to 5 mol % of $Al_2O_3$, 11.5 mol % to 14.5 mol % $B_2O_3$, 4.5 mol % to 8 mol % $Na_2O$, 0.5 mol % to 3 mol % $K_2O$, 0.5 mol % to 2.5 mol % MgO, and 0 mol % to 4 mol % CaO.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the description serve to explain principles and operation of the various embodiments. In the drawings.

DETAILED DESCRIPTION

Reference will now be made in detail to various embodiments, examples of which are illustrated in the accompanying drawings. Embodiments of the disclosure relate to a borosilicate glass composition that is able to be fusion formed or is fusion-formed to a glass ply having a thicknesses of at least 2 mm, in particular, at least 3 mm, at least 3.3 mm, or at least 3.8 mm. In embodiments, the borosilicate glass composition includes at least 74 mol % $SiO_2$, at least 10 mol % $B_2O_3$, and at least some $Al_2O_3$, and in embodiments, the total amount of $SiO_2$, $B_2O_3$, and $Al_2O_3$ is at least 90 mol %. The borosilicate glass compositions described herein exhibit a liquidus viscosity of at least 500 kiloPoise (kP) and a temperature ($T_{200P}$) at which the viscosity is 200 Poise (P) of 1725° C. or less.

Further, embodiments of the borosilicate glass composition disclosed herein are particularly suitable for use in laminates for automotive glazing applications. In one or more embodiments, the borosilicate glass composition is used as an outer ply in such laminates. As compared to conventional automotive glazings including soda-lime glass plies, the glass plies made of the disclosed borosilicate glass composition densify during deformation, helping prevent formation (initiation) or spread (propagation) of radial or median cracks that tend to compromise the strength of the glass ply. Further, the borosilicate glass composition disclosed herein is more resistant to thermal shock than soda-lime glass, which also helps to prevent crack initiation and propagation. These performance advantages can be useful when the borosilicate glass composition is used as an inner glass ply or an outer glass ply of a glass laminate. In some instances, these performance advantages are particularly useful when the borosilicate glass composition is used as an outer glass ply in a laminate. These and other aspects and advantages of the disclosed borosilicate glass composition and articles formed therefrom will be described more fully below. The embodiments discussed herein are presented by way of illustration and not limitation.

Figure 1:
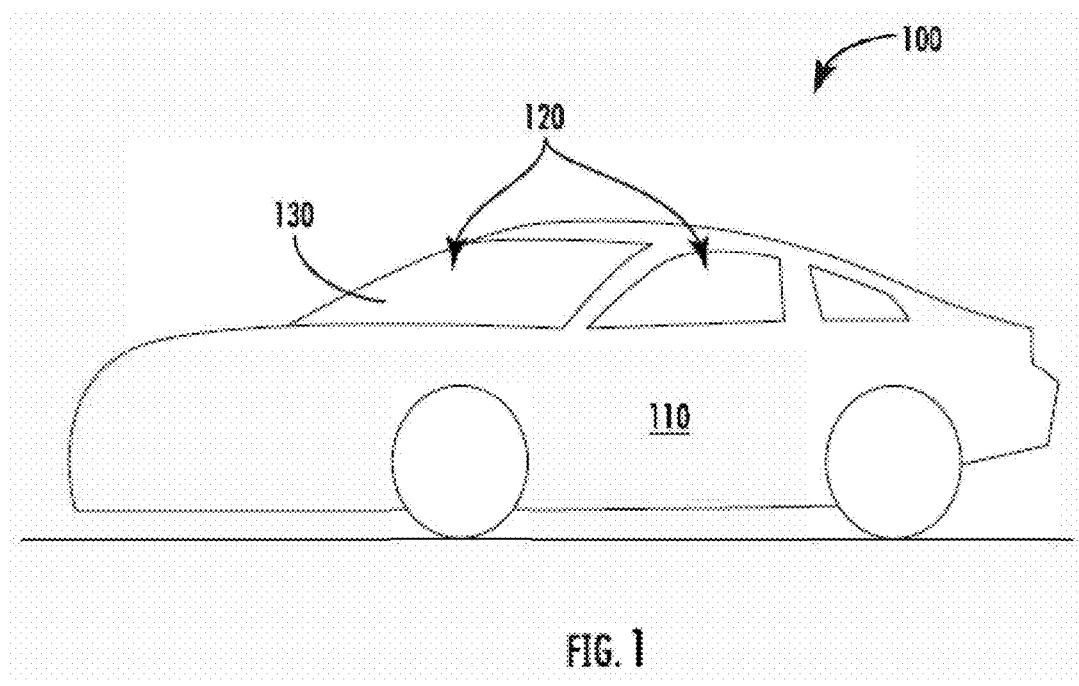
FIG. 1 is an illustration of a vehicle including a glass article or laminate according to one or more embodiments.

Embodiments to the borosilicate glass composition are described herein in relation to a vehicle 100 as shown in FIG. 1. The vehicle 100 includes a body 110 defining an interior and at least one opening 120 in communication with the interior. The vehicle 100 further includes an automotive glazing 130, i.e., window, disposed in the opening 120. The automotive glazing comprises at least one ply of the borosilicate glass composition described herein. The automotive glazing 130 may form at least one of the sidelights, windshield, rear window, windows, and sunroofs in the vehicle 100. In some embodiments, the automotive glazing 130 may form an interior partition (not shown) within the interior of the vehicle 100, or may be disposed on an exterior surface of the vehicle 100 and form, e.g., an engine block cover, headlight cover, taillight cover, door panel cover, or pillar cover. As used herein, vehicle includes automobiles (an example of which is shown in FIG. 1), rolling stock, locomotive, boats, ships, and airplanes, helicopters, drones, space craft, and the like. Further, while the present disclosure is framed in terms of a vehicle, the borosilicate glass composition may be used in other contexts, such as architectural glazing or bullet-resistant glazing applications.

Figure 2:
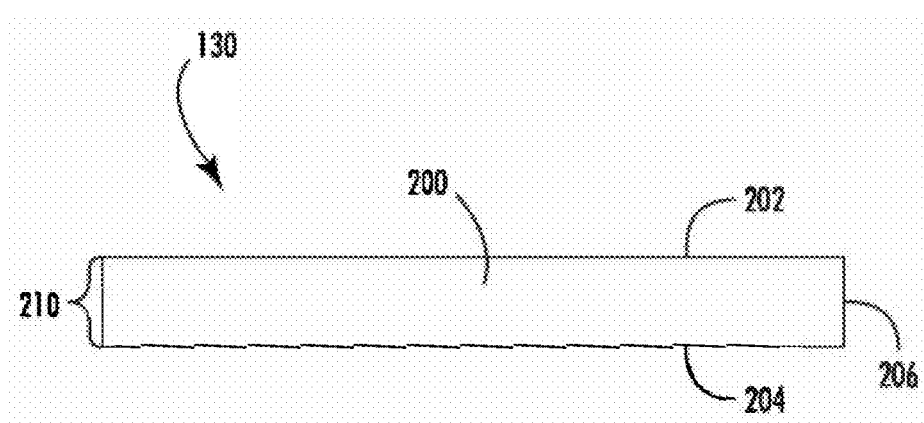
FIG. 2 is a side view illustration of a glass article according to one or more embodiments.

As shown in FIG. 2, in embodiments, the automotive glazing 130 includes at least one glass ply 200 comprising, consisting of or consisting essentially of the embodiments of the borosilicate glass composition described herein. In one or more embodiments, the automotive glazing 130 includes only a single glass ply 200 (i.e., the single glass ply is sometimes referred in the industry as a monolith). As can be seen in FIG. 2, the glass ply 200 has a first major surface 202 and a second major surface 204. The first major surface 202 is opposite to the second major surface 204. A minor surface 206 extends around the periphery of the glass ply 200 and connects the first major surface 202 and the second major surface 204.

A first thickness 210 is defined between the first major surface 202 and the second major surface 204. In embodiments, the first thickness 210 is at least 0.5 mm, at least 1 mm, at least 2 mm, at least 3 mm, at least 3.3 mm, or at least 3.8 mm. In one or more embodiments, the first thickness is in a range from about 0.1 mm to about 6 mm, 0.2 mm to about 6 mm, 0.3 mm to about 6 mm, 0.4 mm to about 6 mm, 0.5 mm to about 6 mm, 0.6 mm to about 6 mm, 0.7 mm to about 6 mm, 0.8 mm to about 6 mm, 0.9 mm to about 6 mm, 1 mm to about 6 mm, 1.1 mm to about 6 mm, 1.2 mm to about 6 mm, 1.3 mm to about 6 mm, 1.4 mm to about 6 mm, 1.5 mm to about 6 mm, 1.6 mm to about 6 mm, from about 1.8 mm to about 6 mm, from about 2 mm to about 6 mm, from about 2.2 mm to about 6 mm, from about 2.4 mm to about 6 mm, from about 2.6 mm to about 6 mm, from about 2.8 mm to about 6 mm, from about 3 mm to about 6 mm, from about 3.1 mm to about 6 mm, from about 3.2 mm to about 6 mm, from about 3.3 mm to about 6 mm, from about 3.4 mm to about 6 mm, from about 3.5 mm to about 6 mm, from about 3.6 mm to about 6 mm, from about 3.7 mm to about 6 mm, from about 3.8 mm to about 6 mm, from about 3.9 mm to about 6 mm, from about 4 mm to about 6 mm, from about 4.2 mm to about 6 mm, from about 4.4 mm to about 6 mm, from about 4.5 mm to about 6 mm, from about 4.6 mm to about 6 mm, from about 4.8 mm to about 6 mm, from about 5 mm to about 6 mm, from about 5.2 mm to about 6 mm, from about 5.4 mm to about 6 mm, from about 5.5 mm to about 6 mm, from about 5.6 mm to about 6 mm, from about 5.8 mm to about 6 mm, from about 1.6 mm to about 5.8 mm, from about 1.6 mm to about 5.6 mm, from about 1.6 mm to about 5.5 mm, from about 1.6 mm to about 5.4 mm, from about 1.6 mm to about 5.2 mm, from about 1.6 mm to about 5 mm, from about 1.6 mm to about 4.8 mm, from about 1.6 mm to about 4.6 mm, from about 1.6 mm to about 4.4 mm, from about 1.6 mm to about 4.2 mm, from about 1.6 mm to about 4 mm, from about 1.6 mm to about 3.9 mm, from about 1.6 mm to about 3.8 mm, from about 1.6 mm to about 3.7 mm, from about 1.6 mm to about 3.6 mm, from about 1.6 mm to about 3.5 mm, from about 1.6 mm to about 3.4 mm, from about 1.6 mm to about 3.3 mm, from about 1.6 mm to about 3.2 mm, from about 1.6 mm to about 3.1 mm, from about 1.6 mm to about 3 mm, from about 1.6 mm to about 2.8 mm, from about 1.6 mm to about 2.6 mm, from about 1.6 mm to about 2.4 mm, from about 1.6 mm to about 2.2 mm, from about 1.6 mm to about 2 mm, from about 1.6 mm to about 1.8 mm, from about 3 mm to about 5 mm, or from about 3 mm to about 4 mm. In other embodiments, the glass ply may be thinner than 2 mm or thicker than 6 mm.

In some embodiments, the glass ply may have curvature, such as rounded geometry or tubular, such as where the first major surface is an exterior and the second major surface is an interior surface of the tube. In some embodiments, a perimeter of the glass ply is generally rectilinear and in other embodiments the perimeter is complex. The first major surface may have apertures, slots, holes, bumps, dimples, or other geometry.

As will be discussed more fully below, in one or more embodiments, the glass ply 200 is a fusion-formed borosilicate glass composition having a liquidus viscosity of at least 500 kP and a $T_{200P}$ of 1725° C. or less.

Figure 3:
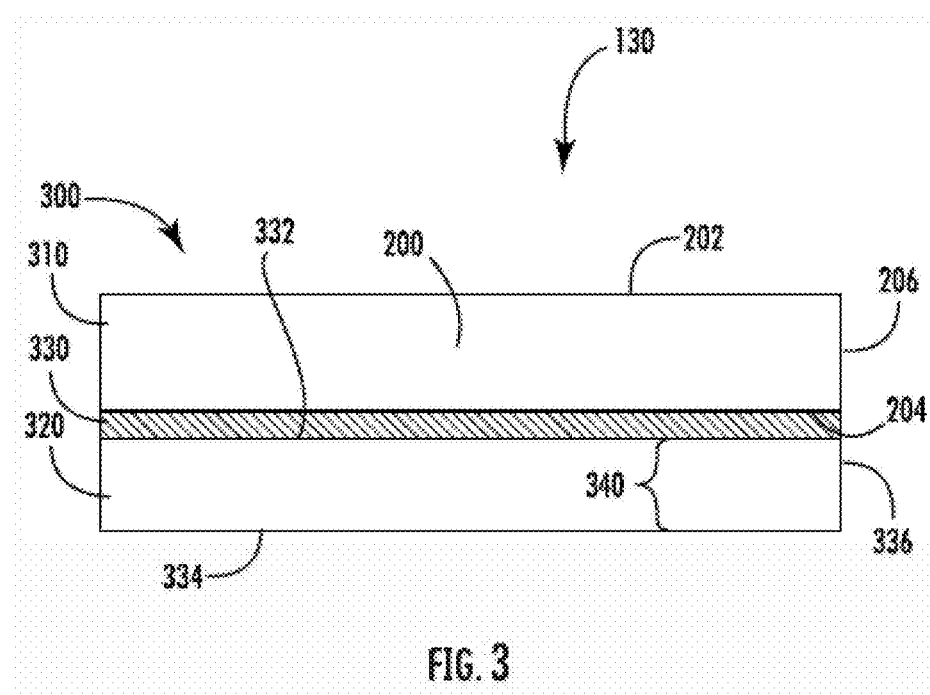
FIG. 3 is a side view illustration of a laminate including a glass article according to one or more embodiments.

FIG. 3 depicts an embodiment of the automotive glazing 130 in which the automotive glazing 130 is a laminate structure 300 including the glass ply 200 of FIG. 2 as a first glass ply 310. As referenced above, the glass ply 200 can comprise, consist of or consist essentially of an embodiment of the borosilicate glass composition described herein. In the embodiment shown in FIG. 3, the first glass ply 310 is joined to a second glass ply 320 by an interlayer 330. In particular, the second glass ply 320 has a third major surface 332 and a fourth major surface 334. The third major surface 332 is opposite to the fourth major surface 334. A minor surface 336 extends around the periphery of the second glass ply 320 and connects the third major surface 332 and the fourth major surface 334.

A second thickness 340 is defined between the third major surface 332 and the fourth major surface 334. In embodiments, the second thickness 340 is less than the first thickness 210 of the first glass ply 310. In embodiments, the second glass thickness is 2 mm or less. In embodiments, the total glass thickness (i.e., the first thickness 210 plus the second thickness 340) is 8 mm or less, 7 mm or less, 6.5 mm or less, 6 mm or less, 5.5 mm or less, or 5 mm or less. In embodiments, the lower limit of the total glass thickness is about 2 mm.

In embodiments, the second glass ply 320 comprises a glass composition that is different from the borosilicate glass composition of the first glass ply 310. In embodiments, the second glass composition comprises a soda lime silicate composition, an aluminosilicate glass composition, an alkali aluminosilicate glass composition, an alkali containing borosilicate glass composition, an alkali aluminophosphosilicate glass composition, or an alkali aluminoborosilicate glass composition.

Further, in embodiments, the first glass ply 310 and/or the second glass ply 320 may be strengthened. For example, the first glass ply 310 and/or the second glass ply 320 may be thermally, chemically and/or mechanically strengthened. In particular, in embodiments, the first glass ply 310 and/or the second glass ply 320 is chemically strengthened through an ion-exchange treatment. In one or more embodiments, the first glass ply 310 and/or the second glass ply 320 is mechanically strengthened by utilizing a mismatch of the coefficient of thermal expansion between portions of the ply to create a compressive stress region and a central region exhibiting a tensile stress. In some embodiments, the first glass ply 310 and/or the second glass ply 320 may be strengthened thermally by heating the glass ply to a temperature above the glass transition point and then rapidly quenching. In some embodiments, various combinations of chemical, mechanical and thermal strengthening may be used to strengthen the second glass ply 320. In one or more embodiments, the second glass ply 320 is strengthened while the first glass ply 310 is unstrengthened a (but may optionally be annealed), and exhibits a surface compressive stress of less than about 3 MPa, or about 2.5 MPa or less, 2 MPa or less, 1.5 MPa or less, 1 MPa or less, or about 0.5 MPa or less.

In one or more embodiments, the interlayer 330 bonds the second major surface 204 of the first glass ply 310 to the third major surface 332 of the second glass ply 320. In embodiments, the interlayer 330 comprises a polymer, such as at least one of polyvinyl butyral (PVB), acoustic PVB (APVB), an ionomer, an ethylene-vinyl acetate (EVA) and a thermoplastic polyurethane (TPU), a polyester (PE), a polyethylene terephthalate (PET), or the like. The thickness of the interlayer may be in the range from about 0.5 mm to about 2.5 mm, in particular from about 0.7 mm to about 1.5 mm. In other embodiments the thickness may be less than 0.5 mm or more than 2.5 mm. Further, in embodiments, the interlayer 330 may comprise multiple polymeric layers or films providing various functionalities to the laminate structure 300. For example, the interlayer 330 may incorporate at least one of a display feature, solar insulation, sound dampening, an antenna, an anti-glare treatment, or an anti-reflective treatment, among others. In particular embodiments, the interlayer 330 is modified to provide ultraviolet (UV) absorption, infrared (IR) absorption, IR reflection, acoustic control/dampening, adhesion promotion, and tint. The interlayer 330 can be modified by a suitable additive such as a dye, a pigment, dopants, etc. to impart the desired property.

In one or more embodiments, the first glass ply 310 or second glass play 320 may be provided with a functional or decorative coating in addition to or in the alternative to the functional or decorative film of the interlayer 330. In embodiments, the coating is at least one of an infrared reflective (IRR) coating, frit, anti-reflective coating, or pigment coating. In an example embodiment of an IRR, the second major surface 204 of the first glass ply 310 or the third major surface 332 of the second glass ply 320 is coated with an infrared-reflective film and, optionally, one or more layers of a transparent dielectric film. In embodiments, the infrared-reflecting film comprises a conductive metal, such as silver, gold, or copper, that reduces the transmission of heat through the coated ply 310, 320. In embodiments, the optional dielectric film can be used to anti-reflect the infrared-reflecting film and to control other properties and characteristics of the coating, such as color and durability. In embodiments, the dielectric film comprises one or more oxides of zinc, tin, indium, bismuth, and titanium, among others. In an example embodiment, the IRR coating includes one or two silver layers each sandwiched between two layers of a transparent dielectric film. In embodiments, the IRR coating is applied using, e.g., physical or chemical vapor deposition or via lamination.

In embodiments, one or both of the first glass ply 310 and the second glass ply 320 includes frit. In embodiments, the frit is applied, e.g., to the second major surface 204 of the first glass ply 310, the third major surface 332 of the second glass ply 320, and/or the fourth major surface 334 of the second glass ply 320. In embodiments, the frit provides an enhanced bonding surface for adhesives such as the interlayer 330 or an adhesive joining the glazing 130 to a bonding surface defining an opening 120 in the vehicle body 110. Additionally, in embodiments, the frit provides a decorative border for the glazing 130. Further, in embodiments, the frit may be used in addition to the IRR coating described above. In embodiments, the frit is an enamel frit. In other embodiments, the frit is designed such that it is ion-exchangeable. That is, the frit can be applied to an ion-exchangeable glass prior to undergoing an ion-exchange treatment. Such frit is configured to allow the exchange of ions between the glass and the treatment bath. In embodiments, the frit is a Bi—Si—B alkali system, a Zn-based Bi-system, a Bi—Zn-system, a Bi-system, an Si—Zn—B—Ti system with no or low Bi, an Si—Bi—Zn—B-alkali system, and/or an Si—Bi—Ti—B—Zn-akali system, among others. An example of an ion-exchangeable frit, including colorant, comprises 45.11 mol % $Bi_2O_3$, 20.61 mol % $SiO_2$, 13.56 mol % $Cr_2O_3$, 5.11 mol % CuO, 3.48 mol % MnO, 3.07 mol % ZnO, 2.35 mol % $B_2O_3$, 1.68 mol % $TiO_2$, 1.60 mol % $Na_2O$, 1.50 mol % $Li_2O$, 0.91 mol % $K_2O$, 0.51 mol % $Al_2O_3$, 0.15 mol % $P_2O_5$, 0.079 mol % $SO_3$, 0.076 mol % BaO, 0.062 mol % $ZrO_2$, 0.060 mol % $Fe_2O_3$, 0.044 mol % $MoO_3$, 0.048 mol % CaO, 0018 mol % $Nb_2O_5$, 0.006 mol % Cl, and 0.012 mol % SrO. Other examples of ion-exchangeable frits are disclosed in U.S. Pat. No. 9,346,708B2 (application Ser. No. 13/464,493, filed May 4, 2012) and U.S. Publication No. 2016/0002104A1 (application Ser. No. 14/768,832, filed Aug. 19, 2015), both of which are incorporated herein by reference in their entireties.

In embodiments, the second glass ply 320 may be provided with a colorant coating comprised of an ink, such as an organic ink. In embodiments particularly suitable for such a colorant coating, the colorant coating is applied to the third major surface 332 of the second glass ply 320 or to the fourth major surface 334 of the second glass ply 320, and the second glass ply 320 is cold-formed against the first glass ply 310. Advantageously, such colorant coatings can be applied to the second glass ply 320 while the second glass ply 320 is in a planar configuration, and then the second glass ply 320 can be cold formed to a curved configuration without disrupting the colorant coating, e.g., organic ink coating. In an embodiment, the colorant coating comprises at least one pigment, at least one mineral filler, and a binder comprising an alkoxysilane functionalized isocyanurate or an alkoxysilane functionalized biuret. Examples of such colorant coatings are described in European Patent No. 2617690B1, incorporated herein by reference in its entirety. Other suitable colorant coatings and methods of applying the colorant coatings are described in U.S. Publication No. 2020/0171800A1 (application Ser. No. 16/613,010, filed on Nov. 12, 2019) and U.S. Pat. No. 9,724,727 (application Ser. No. 14/618,398, filed Feb. 10, 2015), both of which are incorporated herein by reference in their entireties.

In embodiments, the coating is an anti-reflective coating. In particular embodiments, the anti-reflective coating is applied to the fourth major surface 334 of the second glass ply 320. In embodiments, the anti-reflective coating comprises multiple layers of low and high index materials or low, medium, and high index materials. For example, in embodiments, the anti-reflective coating includes from two to twelve layers of alternating low and high index materials, such as silica (low index) and niobia (high index). In another example embodiment, the anti-reflective coating includes from three to twelve layers of repeating low, medium, and high index materials, such as silica (low index), alumina (medium index), and niboia (high index). In still other embodiments, the low index material in the stack may be an ultra low index material, such as magnesium fluoride or porous silica. In general, anti-reflective coatings having more layers in the stack will perform better at higher angles of incidence than anti-reflective coatings having less layers in the stack. For example, at an angle of incidence of, e.g., greater than 60°, an anti-reflective coating stack having four layers will perform better (less reflection) than an anti-reflective coating stack having two layers. Further, in embodiments, an anti-reflective coating stack having an ultra low index material will perform better (less reflection) than an anti-reflective coating stack having a low index material. Other anti-reflective coatings known in the art may also be suitable for application to the laminate 300.

In embodiments, the glass ply 200 or laminate 300 exhibits at least one curvature comprising a radius of curvature that is in the range of 300 mm to about 10 m along at least a first axis. In embodiments, the glass ply 200 or laminate 300 exhibits at least one curvature comprising a radius of curvature that is in the range of 300 mm to about 10 m along a second axis that is transverse, in particular perpendicular, to the first axis. In other embodiments the glass ply exhibits curvature but the curvature has a radius of curvature less than 300 μm or greater than 10 m. In some embodiments, the curvature is complex and changing.

In embodiments, the curvature(s) are introduced into the glass ply 200 or each glass ply 310, 320 of the glass laminate 300 through a thermal process. The thermal process may include a sagging process that uses gravity to shape the glass ply 200 or glass plies 310, 320 when heated. In the sagging step, a glass ply, such as glass ply 200, is placed on a mold having an open interior, heated in a furnace (e.g., a box furnace, or a lehr furnace), and allowed to gradually sag under the influence of gravity into the open interior of the mold. In one or more embodiments, the thermal process may include a pressing process that uses a mold to shape the glass ply 200 or glass plies 310, 320 when heated or while heating. In some embodiments, two glass plies, such as glass plies 310, 320, are shaped together in a "pair-shaping" process. In such a process, one glass ply is placed on top of another glass ply to form a stack (which may also include an intervening release layer), which is placed on the mold. In embodiments, to facilitate the pair-shaping process, the glass ply 310, 320 used as an inner and/or thinner glass ply has a pair-shaping temperature (temperature at $10^{11}$ Poise) that is greater than the outer and/or thicker glass ply 310, 320.

In one or more embodiments, the mold may have an open interior for use in a sagging process. The stack and mold are both heated by placing them in the furnace, and the stack is gradually heated to the bend or sag temperature of the glass plies. During this process, the plies are shaped together to a curved shape. Advantageously, the viscosity curve for at least some of the presently disclosed borosilicate glass composition at a viscosity of $10^{11}$ Poise is similar to conventional float-formed borosilicate glass compositions, allowing for existing equipment and techniques to be utilized for forming the glass ply 200 or plies 310, 320.

According to an exemplary embodiment, heating time and temperature are selected to obtain the desired degree of curvature and final shape. Subsequently, the glass ply or glass plies are removed from the furnace and cooled. For pair-shaped glass plies, the two glass plies are separated, re-assembled with an interlayer, such as interlayer 330, between the glass plies and heated, e.g., under vacuum to seal the glass plies and interlayer together into a laminate.

In one or more embodiments, only one glass ply is curved using heat (e.g., by a sag process or press process), and the other glass ply is curved using a cold-forming process by pressing the glass ply to be curved into conformity with the already curved glass ply at a temperature less than the softening temperature of the glass composition (in particular at a temperature of 200° C. or less, 100° C. or less, 50° C. or less, or at room temperature). Pressure to cold-form the glass ply against the other glass ply may be provided by, e.g., a vacuum, a mechanical press, or one or more clamps. The cold-formed glass ply may be held into conformity with the curved glass ply via the interlayer and/or mechanically clamped thereto or otherwise coupled.

Figure 4:
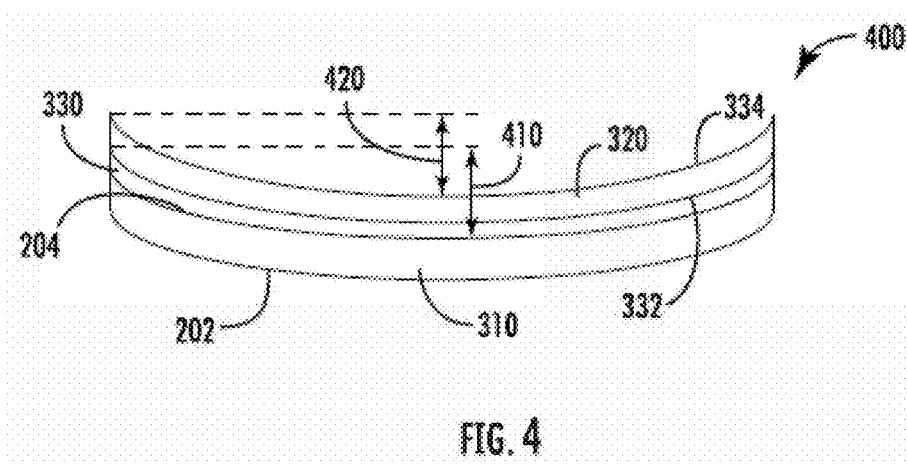
FIG. 4 is a side view illustration of a laminate including a glass article according to one or more embodiments.

FIG. 4 depicts an exemplary embodiment of a curved glass laminate 400. As can be seen in FIG. 4, the second major surface 204 of the first glass ply 310 has a first curvature depth 410 defined as the maximum depth from planar (dashed line) of the second major surface 204. In embodiments in which the second glass ply 320 is curved, the fourth major surface 334 of the second glass ply 320 has a second curvature depth 420 defined as the maximum depth from planar (dashed line) of the fourth major surface 334.

In embodiments, one or both the first curvature depth 410 and the second curvature depth 420 is about 2 mm or greater. Curvature depth may be defined as maximum distance a surface is distanced orthogonally from a plane defined by points on a perimeter of that surface. For example, one or both the first curvature depth 410 and the second curvature depth 420 may be in a range from about 2 mm to about 30 mm. In embodiments, the first curvature depth 410 and the second curvature depth 420 are substantially equal to one another. In one or more embodiments, the first curvature depth 410 is within 10% of the second curvature depth 420, in particular within 5% of the second curvature depth 420. For illustration, the second curvature depth 420 is about 15 mm, and the first curvature depth 410 is in a range from about 13.5 mm to about 16.5 mm (or within 10% of the second sag depth 420).

In one or more embodiments, the first curved glass ply 310 and the second curved glass ply 330 comprise a shape deviation therebetween the first curved glass ply 310 and the second curved glass ply 320 of ±5 mm or less as measured by an optical three-dimensional scanner such as the ATOS Triple Scan supplied by GOM GmbH, located in Braunschweig, Germany. In one or more embodiments, the shape deviation is measured between the second major surface 204 and the third major surface 332, or between the first major surface 202 and the fourth major surface 334. In one or more embodiments, the shape deviation between the first glass ply 310 and the second glass ply 320 is about ±4 mm or less, about ±3 mm or less, about ±2 mm or less, about ±1 mm or less, about ±0.8 mm or less, about ±0.6 mm or less, about ±0.5 mm or less, about ±0.4 mm or less, about ±0.3 mm or less, about ±0.2 mm or less, or about ±0.1 mm or less. As used herein, the shape deviation applies to stacked glass plies (i.e., with no interlayer) and refers to the maximum deviation from the desired curvature between coordinating positions on the respective second major surface 204 and third major surface 332 or the first major surface 202 and the fourth major surface 334.

In one or more embodiments, one of or both the first major surface 202 and the fourth major surface 334 exhibit minimal optical distortion. For example, one of or both the first major surface 202 and the fourth major surface 334 exhibit less than about 400 millidiopters, less than about 300 millidiopters, less than about 250 millidiopters, or less than about 200 millidiopters as measured by an optical distortion detector using transmission optics according to ASTM 1561. A suitable optical distortion detector is supplied by ISRA VISIION AG, located in Darmstadt, Germany, under the tradename SCREENSCAN-Faultfinder. In one or more embodiments, one of or both the first major surface 202 and the fourth major surface 334 exhibit about 190 millidiopters or less, about 180 millidiopters or less, about 170 millidiopters or less, about 160 millidiopters or less, about 150 millidiopters or less, about 140 millidiopters or less, about 130 millidiopters or less, about 120 millidiopters or less, about 110 millidiopters or less, about 100 millidiopters or less, about 90 millidiopters or less, about 80 millidiopters or less, about 70 millidiopters or less, about 60 millidiopters or less, or about 50 millidiopters or less. As used herein, the optical distortion refers to the maximum optical distortion measured on the respective surfaces.

It is believed that the reduction in optical distortion for the glass ply 200 or plies 310, 320 is related to both the borosilicate glass composition disclosed herein and the fusion forming process made possible by the disclosed borosilicate glass composition. As related to the forming process, conventional float glass techniques for forming borosilicate glass compositions involve floating molten glass on liquid tin, and the glass naturally has a thickness of 6 mm or more when floating on tin. To produce lower thicknesses, the glass is stretched or drawn while floating, which produces variations in the thickness across the surface of the glass known as drawlines and which produces internal stresses. The drawlines and internal stresses can both contribute to optical distortion. By fusion forming the borosilicate glass composition according to the present disclosure, such drawlines and internal stresses are substantially avoided. Further, the outer surfaces of the glass ply 200 or plies 310, 320 are not in contact with any structures during fusion forming, which also reduces optical distortion. With respect to the composition, the borosilicate glass disclosed herein allows for fusion forming of the glass ply 200 or plies 310, 320 by providing a liquidus viscosity of at least 500 kP and a $T_{200P}$ of 1725° C. or less. Moreover, the borosilicate glass composition according to the present disclosure is also believed to reduce refractive index variation across the surface of the glass ply 200 or plies 310, 320 as compared to conventionally used soda-lime silicate glass compositions. Variation in refractive index is also known to cause optical distortion, and thus, reduction in refractive index variation is expected to decrease optical distortion.

In one or more embodiments, the first major surface or the second major surface of the first curved glass ply exhibits low membrane tensile stress. Membrane tensile stress can occur during cooling of curved plies and laminates. As the glass cools, the major surfaces and edge surfaces (orthogonal to the major surfaces) can develop surface compression, which is counterbalanced by a central region exhibiting a tensile stress. Such stresses can, in certain circumstances, be problematic around the periphery where edge cooling effects set up stresses and bending tools create thermal gradients that generate stresses. The low CTE associated with embodiments of the presently disclosed borosilicate glass composition minimizes adverse residual stresses that may arise during the annealing process of hot forming. Such stresses are proportional to the CTE, and thus, by decreasing the CTE of the borosilicate glass composition, the residual stresses are also decreased.

Bending or shaping can introduce additional surface tension near the edge and causes the central tensile region to approach the glass surface. Accordingly, membrane tensile stress is the tensile stress measured near the edge (e.g., about 10-25 mm from the edge surface). In one or more embodiments, the membrane tensile stress at the first major surface or the second major surface of the first curved glass ply is less than about 7 megaPascals (MPa) as measured by an edge stress meter according to ASTM C1279. An example of such a surface stress meter is an Edge Stress Meter or VRP (both commercially available from Strainoptic Technologies). In one or more embodiments, the membrane tensile stress at the first major surface or the second major surface of the first curved glass ply is about 6 MPa or less, about 5 MPa or less, about 4 MPa or less, or about 3 MPa or less. In one or more embodiments, the lower limit of membrane tensile stress is about 0.01 MPa or about 0.1 MPa. In other embodiments, membrane tensile stress may be negligible (e.g., about 0). As recited herein, stress is designated as either compressive or tensile, with the magnitude of such stress provided as an absolute value.

In one or more embodiments, the laminate 300, 400 may have a thickness of 10 mm or less, 9 mm or less, 8 mm or less, 7 mm or less, or 6 mm or less where the thickness comprises the sum of thicknesses of the first glass ply 310, the second glass ply 320, and the interlayer 330. In various embodiments, the laminate 300, 400 may have a thickness in the range of about 1.8 mm to about 10 mm, or in the range of about 1.8 mm to about 9 mm, or in the range of about 1.8 mm to about 8 mm, or in the range of about 1.8 mm to about 7 mm, or in the range of about 1.8 mm to about 6 mm, or in the range of about 1.8 mm to about 5 mm, or 2.1 mm to about 10 mm, or in the range of about 2.1 mm to about 9 mm, or in the range of about 2.1 mm to about 8 mm, or in the range of about 2.1 mm to about 7 mm, or in the range of about 2.1 mm to about 6 mm, or in the range of about 2.1 mm to about 5 mm, or in the range of about 2.4 mm to about 10 mm, or in the range of about 2.4 mm to about 9 mm, or in the range of about 2.4 mm to about 8 mm, or in the range of about 2.4 mm to about 7 mm, or in the range of about 2.4 mm to about 6 mm, or in the range of about 2.4 mm to about 5 mm, or in the range of about 3.4 mm to about 10 mm, or in the range of about 3.4 mm to about 9 mm, or in the range of about 3.4 mm to about 8 mm, or in the range of about 3.4 mm to about 7 mm, or in the range of about 3.4 mm to about 6 mm, or in the range of about 3.4 mm to about 5 mm. In other embodiments, the laminate thickness may be less than 1.8 mm or greater than 10 mm.

In one or more embodiments the second curved glass ply (or the second glass ply used to form the second curved glass ply) is relatively thin in comparison to the first curved glass ply (or the first glass ply used to form the first curved glass ply). In other words, the first curved glass ply (or the first glass ply used to form the first curved glass ply) has a thickness greater than the second curved glass ply (or the second glass ply used to form the second curved glass ply). In one or more embodiments, the first thickness (or the thickness of the first glass ply used to form the first curved glass ply) is more than two times the second thickness. In one or more embodiments, the first thickness (or the thickness of the first glass ply used to form the first curved glass ply) is in the range from about 1.5 times to about 10 times the second thickness (e.g., from about 1.75 times to about 10 times, from about 2 times to about 10 times, from about 2.25 times to about 10 times, from about 2.5 times to about 10 times, from about 2.75 times to about 10 times, from about 3 times to about 10 times, from about 3.25 times to about 10 times, from about 3.5 times to about 10 times, from about 3.75 times to about 10 times, from about 4 times to about 10 times, from about 1.5 times to about 9 times, from about 1.5 times to about 8 times, from about 1.5 times to about 7.5 times, from about 1.5 times to about 7 times, from about 1.5 times to about 6.5 times, from about 1.5 times to about 6 times, from about 1.5 times to about 5.5 times, from about 1.5 times to about 5 times, from about 1.5 times to about 4.5 times, from about 1.5 times to about 4 times, from about 1.5 times to about 3.5 times, from about 2 times to about 7 times, from about 2.5 times to about 6 times, from about 3 times to about 6 times). In other embodiments, the plies may be otherwise sized, such as the second ply being thicker or the same thickness as the first.

In one or more embodiments, the second thickness (or the thickness of the second glass ply used to form the second curved glass ply) is less than 2.0 mm (e.g., 1.95 mm or less, 1.9 mm or less, 1.85 mm or less, 1.8 mm or less, 1.75 mm or less, 1.7 mm or less, 1.65 mm or less, 1.6 mm or less, 1.55 mm or less, 1.5 mm or less, 1.45 mm or less, 1.4 mm or less, 1.35 mm or less, 1.3 mm or less, 1.25 mm or less, 1.2 mm or less, 1.15 mm or less, 1.1 mm or less, 1.05 mm or less, 1 mm or less, 0.95 mm or less, 0.9 mm or less, 0.85 mm or less, 0.8 mm or less, 0.75 mm or less, 0.7 mm or less, 0.65 mm or less, 0.6 mm or less, 0.55 mm or less, 0.5 mm or less, 0.45 mm or less, 0.4 mm or less, 0.35 mm or less, 0.3 mm or less, 0.25 mm or less, 0.2 mm or less, 0.15 mm or less, or about 0.1 mm or less). The lower limit of thickness may be 0.1 mm, 0.2 mm or 0.3 mm. In some embodiments, the second thickness (or the thickness of the second glass ply used to form the second curved glass ply) is in the range from about 0.1 mm to less than about 2.0 mm, from about 0.1 mm to about 1.9 mm, from about 0.1 mm to about 1.8 mm, from about 0.1 mm to about 1.7 mm, from about 0.1 mm to about 1.6 mm, from about 0.1 mm to about 1.5 mm, from about 0.1 mm to about 1.4 mm, from about 0.1 mm to about 1.3 mm, from about 0.1 mm to about 1.2 mm, from about 0.1 mm to about 1.1 mm, from about 0.1 mm to about 1 mm, from about 0.1 mm to about 0.9 mm, from about 0.1 mm to about 0.8 mm, from about 0.1 mm to about 0.7 mm, from about 0.2 mm to less than about 2.0 mm, from about 0.3 mm to less than about 2.0 mm, from about 0.4 mm to less than about 2.0 mm, from about 0.5 mm to less than about 2.0 mm, from about 0.6 mm to less than about 2.0 mm, from about 0.7 mm to less than about 2.0 mm, from about 0.8 mm to less than about 2.0 mm, from about 0.9 mm to less than about 2.0 mm, or from about 1.0 mm to about 2.0 mm. In other embodiments, the second ply can be thicker than 2.0 mm or thinner than 0.1 mm, such as less than 700 µm, 500 µm, 300 µm, 200 µm, 100 µm, 80 µm, 40 µm, and/or at least 10 µm.

In some embodiments, the first thickness (or the thickness of the first glass ply used to form the first curved glass ply) is about 2.0 mm or greater. In such embodiments, first thickness (or the thickness of the first glass ply used to form the first curved glass ply) and the second thickness (or the thickness of the second glass ply used to form the second curved glass ply) differ from one another. For example, the first thickness (or the thickness of the first glass ply used to form the first curved glass ply) is about 2.0 mm or greater, about 2.1 mm or greater, about 2.2 mm or greater, about 2.3 mm or greater, about 2.4 mm or greater, about 2.5 mm or greater, about 2.6 mm or greater, about 2.7 mm or greater, about 2.8 mm or greater, about 2.9 mm or greater, about 3.0 mm or greater, about 3.1 mm or greater, about 3.2 mm or greater, about 3.3 mm or greater, 3.4 mm or greater, 3.5 mm or greater, 3.6 mm or greater, 3.7 mm or greater, 3.8 mm or greater, 3.9 mm or greater, 4 mm or greater, 4.2 mm or greater, 4.4 mm or greater, 4.6 mm or greater, 4.8 mm or greater, 5 mm or greater, 5.2 mm or greater, 5.4 mm or greater, 5.6 mm or greater, 5.8 mm or greater, or 6 mm or greater. In some embodiments the first thickness (or the thickness of the first glass ply used to form the first curved glass ply) is in a range from about 2.0 mm to about 6 mm, from about 2.1 mm to about 6 mm, from about 2.2 mm to about 6 mm, from about 2.3 mm to about 6 mm, from about 2.4 mm to about 6 mm, from about 2.5 mm to about 6 mm, from about 2.6 mm to about 6 mm, from about 2.8 mm to about 6 mm, from about 3 mm to about 6 mm, from about 3.2 mm to about 6 mm, from about 3.4 mm to about 6 mm, from about 3.6 mm to about 6 mm, from about 3.8 mm to about 6 mm, from about 4 mm to about 6 mm, from about 2.0 mm to about 5.8 mm, from about 2.0 mm to about 5.6 mm, from about 2.0 mm to about 5.5 mm, from about 2.0 mm to about 5.4 mm, from about 2.0 mm to about 5.2 mm, from about 2.0 mm to about 5 mm, from about 2.0 mm to about 4.8 mm, from about 2.0 mm to about 4.6 mm, from about 2.0 mm to about 4.4 mm, from about 2.0 mm to about 4.2 mm, from about 2.0 mm to about 4 mm, from about 2.0 mm to about 3.8 mm, from about 2.0 mm to about 3.6 mm, from about 2.0 mm to about 3.4 mm, from about 2.0 mm to about 3.2 mm, or from about 2.0 mm to about 3 mm. In other embodiments the first ply can be thicker than 10.0 mm or thinner than 2.0 mm, such as less than 1.5 mm, 1.0 mm, 700 µm, 500 µm, 300 µm, 200 µm, 100 µm, 80 µm, 40 µm, and/or at least 10 µm.

In one or more specific examples, the first thickness (or the thickness of the first glass ply used to form the first curved glass ply) is from about 2.0 mm to about 3.5 mm, and the second thickness (or the thickness of the second glass ply used to form the second curved glass ply) is in a range from about 0.1 mm to less than about 2.0 mm. In embodiments, the ratio of first thickness to total glass thickness is at least 0.7, or at least 0.75, or at least 0.8, or at least 0.85, or at least 0.9.

In one or more embodiments, the laminate 300, 400 is substantially free of visual distortion as measured by ASTM C1652/C1652M. In specific embodiments, the laminate, the first curved glass ply and/or the second curved glass ply are substantially free of wrinkles or distortions that can be visually detected by the naked eye, according to ASTM C1652/C1652M.

In one or more embodiments, the first major surface 202 or the second major surface 204 comprises a surface compressive stress of less than 3 MPa as measured by a surface stress meter, such as the surface stress meter commercially available under the tradename FSM-6000, from Orihara Industrial Co., Ltd. (Japan) ("FSM"). In some embodiments, the first curved glass ply is unstrengthened as will be described herein (but may optionally be annealed), and exhibits a surface compressive stress of less than about 3 MPa, or about 2.5 MPa or less, 2 MPa or less, 1.5 MPa or less, 1 MPa or less, or about 0.5 MPa or less. In some embodiments, such surface compressive stress ranges are present on both the first major surface and the second major surface.

In one or more embodiments, the first and second glass plies used to form the first curved glass ply and second curved ply are substantially planar prior to being pair shaped to form a first curved glass ply and second curved glass ply. In some instances, one or both of the first glass ply and the second glass ply used to form the first curved glass ply and second curved ply may have a 3D or 2.5D shape that does not exhibit the curvature depth desired and will eventually be formed during the pair shaping process and present in the resulting laminate. Additionally or alternatively, the thickness of the one or both of the first curved glass ply (or the first glass ply used to form the first curved glass ply) and the second curved glass ply (or the second glass ply used to form the second curved glass ply) may be constant along one or more dimension or may vary along one or more of its dimensions for aesthetic and/or functional reasons. For example, the edges of one or both of the first curved glass ply (or the first glass ply used to form the first curved glass ply) and the second curved glass ply (or the second glass ply used to form the second curved glass ply) may be thicker as compared to more central regions of the glass ply.

The length (e.g., longest centerline of surface (e.g., first major surface)), width (e.g., longest dimension of the surface orthogonal to the length), and thickness (e.g., dimension of the ply orthogonal to the length and the width) dimensions of the first curved glass ply (or the first glass ply used to form the first curved glass ply) and the second curved glass ply (or the second glass ply used to form the second curved glass ply) may also vary according to the article application or use. In one or more embodiments, the first curved glass ply (or the first glass ply used to form the first curved glass ply) includes a first length and a first width (the first thickness is orthogonal both the first length and the first width), and the second curved glass ply (or the second glass ply used to form the second curved glass ply) includes a second length and a second width orthogonal the second length (the second thickness is orthogonal both the second length and the second width). In one or more embodiments, either one of or both the first length and the first width is about 0.25 meters (m) or greater. For example, the first length and/or the second length may be in a range from about 1 m to about 3 m, from about 1.2 m to about 3 m, from about 1.4 m to about 3 m, from about 1.5 m to about 3 m, from about 1.6 m to about 3 m, from about 1.8 m to about 3 m, from about 2 m to about 3 m, from about 1 m to about 2.8 m, from about 1 m to about 2.8 m, from about 1 m to about 2.8 m, from about 1 m to about 2.8 m, from about 1 m to about 2.6 m, from about 1 m to about 2.5 m, from about 1 m to about 2.4 m, from about 1 m to about 2.2 m, from about 1 m to about 2 m, from about 1 m to about 1.8 m, from about 1 m to about 1.6 m, from about 1 m to about 1.5 m, from about 1.2 m to about 1.8 m or from about 1.4 m to about 1.6 m. In some embodiments, a surface dimension from perimeter to perimeter through a centroid of the respective surface (e.g., first surface, second surface, monolith major surface, ply surface) is at least 1 mm, at least 1 cm, at least 10 cm, at least 1 m, and/or no more than 10 m, whereby a contained fracture may not result in failure of the respective ply. In other embodiments, the ply may be otherwise sized.

For example, the first width and/or the second width may be in a range from about 0.5 m to about 2 m, from about 0.6 m to about 2 m, from about 0.8 m to about 2 m, from about 1 m to about 2 m, from about 1.2 m to about 2 m, from about 1.4 m to about 2 m, from about 1.5 m to about 2 m, from about 0.5 m to about 1.8 m, from about 0.5 m to about 1.6 m, from about 0.5 m to about 1.5 m, from about 0.5 m to about 1.4 m, from about 0.5 m to about 1.2 m, from about 0.5 m to about 1 m, from about 0.5 m to about 0.8 m, from about 0.75 m to about 1.5 m, from about 0.75 m to about 1.25 m, or from about 0.8 m to about 1.2 m. In other embodiments, the ply may be otherwise sized.

In one or more embodiments, the second length is within 5% of the first length (e.g., about 5% or less, about 4% or less, about 3% or less, or about 2% or less). For example if the first length is 1.5 m, the second length may be in a range from about 1.425 m to about 1.575 m and still be within 5% of the first length. In one or more embodiments, the second width is within 5% of the first width (e.g., about 5% or less, about 4% or less, about 3% or less, or about 2% or less). For example if the first width is 1 m, the second width may be in a range from about 1.05 m to about 0.95 m and still be within 5% of the first width.

Having described the glass ply, laminate structure thereof, and uses therefor, the borosilicate glass composition is now described in more detail. In embodiments, the borosilicate glass composition comprises at least 74 mol % $SiO_2$, at least 10 mol % $B_2O_3$, and at least some $Al_2O_3$. In particular embodiments, the borosilicate glass composition includes at least 0.03 mol % of an iron oxide (e.g., $Fe_2O_3$ or FeO). In more particular embodiments, $SiO_2$, $Al_2O_3$, and $B_2O_3$ make up at least 90 mol % of the borosilicate glass composition. Further, the borosilicate glass composition has a liquidus viscosity of at least 500 kiloPoise (kP) and a temperature ($T_{200P}$) at which the viscosity is 200 Poise (P) of 1725° C. or less.

In embodiments, the borosilicate glass composition includes $SiO_2$ in an amount in the range of at least about 72 mol %, more particularly about 72 mol % to about 80 mol %, in particular 74 mol % to 80 mol %. For example, the borosilicate glass composition includes $SiO_2$ in an amount in the range from about 72 mol % to about 85 mol %, from about 73 mol % to about 85 mol %, from about 74 mol % to about 85 mol %, from about 75 mol % to about 85 mol %, from about 76 mol % to about 85 mol %, from about 77 mol % to about 85 mol %, from about 78 mol % to about 85 mol %, from about 79 mol % to about 85 mol %, from about 80 mol % to about 85 mol %, from about 81 mol % to about 85 mol %, from about 82 mol % to about 85 mol %, from about 83 mol % to about 85 mol %, from about 84 mol % to about 85 mol %, from about 74 mol % to about 84 mol %, from about 74 mol % to about 84 mol %, from about 74 mol % to about 83 mol %, from about 74 mol % to about 82 mol %, from about 74 mol % to about 81 mol %, from about 74 mol % to about 80 mol %, from about 74 mol % to about 79 mol %, from about 74 mol % to about 78 mol %, from about 74 mol % to about 77 mol %, from about 74 mol % to about 76 mol %, and all ranges and sub-ranges therebetween. In other embodiments, the glass may have less than 74 mol % $SiO_2$.

In embodiments, the borosilicate glass composition comprises $B_2O_3$ in an amount in the range from about 10 mol % to about 16 mol %, in particular about 11.5 mol % to about 14.5 mol %. In various embodiments, the borosilicate glass composition comprises $B_2O_3$ in an amount in the range from about 10 mol % to about 16 mol %, from about 11 mol % to about 16 mol %, from about 12 mol % to about 16 mol %, from about 13 mol % to about 16 mol %, from about 14 mol % to about 16 mol %, from about 15 mol % to about 16 mol %, from about 11 mol % to about 15 mol %, from about 11 mol % to about 14 mol %, from about 11 mol % to about 13 mol %, from about 11 mol % to about 12 mol %, from about 12 mol % to about 13 mol %, from about 12 mol % to about 14 mol %, from about 14 mol % to about 15 mol %, or any range or sub-ranges therebetween. In other embodiments, the glass may have less than 10 mol % $B_2O_3$ or more than 16 mol % $B_2O_3$.

In embodiments, the borosilicate glass composition includes $Al_2O_3$ in an amount in the range from about 2 mol % to about 6 mol %, in particular about 2.5 mol % to about 5 mol %. In various embodiments, the borosilicate glass composition includes $Al_2O_3$ in an amount in the range from about 2 mol % to about 6 mol %, from about 3 mol % to about 6 mol %, from about 4 mol % to about 6 mol %, from about 5 mol % to about 6 mol %, from about 3 mol % to about 5 mol %, from about 3 mol % to about 4 mol %, from about 4 mol % to about 5 mol %, or any range or sub-ranges therebetween. Advantageously, the $Al_2O_3$ present in these amounts helps prevent phase separation of the borosilicate glass composition. In other embodiments, the glass may have less than 2 mol % $Al_2O_3$ or more than 6 mol % $Al_2O_3$.

In embodiments, the borosilicate glass composition comprises $Na_2O$ in an amount in the range from about 3 mol % to about 8 mol %, in particular from about 4.5 mol % to about 8 mol %. In various embodiments, the borosilicate glass composition comprises $Na_2O$ in an amount in the range from about 3 mol % to about 8 mol %, from about 4 mol % to about 8 mol %, from about 5 mol % to about 8 mol %, from about 6 mol % to about 8 mol %, from about 7 mol % to about 8 mol %, from about 3 mol % to about 7 mol %, from about 4 mol % to about 7 mol %, from about 5 mol % to about 7 mol %, from about 6 mol % to about 7 mol %, from about 4 mol % to about 6 mol %, from about 5 mol % to about 6 mol %, or any ranges and sub-ranges therebetween. In other embodiments, the glass may have less than 3 mol % $Na_2O$ or more than 8 mol % $Na_2O$.

In embodiments, the borosilicate glass composition comprises $K_2O$ in an amount in the range from about 0.5 mol % to about 5 mol %, in particular from about 0.5 mol % to about 3 mol %. In various embodiments, the borosilicate glass composition comprises $K_2O$ in an amount in the range from about 0.5 mol % to about 5 mol %, from about 0.6 mol % to about 5 mol %, from about 0.7 mol % to about 5 mol %, from about 0.8 mol % to about 5 mol %, from about 0.9 mol % to about 5 mol %, from about 1 mol % to about 5 mol %, from about 2 mol % to about 5 mol %, from about 3 mol % to about 5 mol %, from about 4 mol % to about 5 mol %, from about 2 mol % to about 4 mol %, in the range of 3 mol % to 4 mol %, or any ranges and sub-ranges therebetween. In other embodiments, the glass may have less than 0.8 mol % $K_2O$ or more than 5 mol % $K_2O$.

The presence of $Na_2O$ and $K_2O$ has an effect on the liquidus viscosity. Thus, in embodiments, at least one of $Na_2O$ or $K_2O$ is present in an amount of at least 4 mol %. In embodiments, the combined amount of $Na_2O$ and $K_2O$ is present in an amount of at least 5.5 mol % when other alkaline earth oxides (e.g., CaO or MgO) are present in an amount of at least 1.5 mol %. In other embodiments, the combined amount of $Na_2O$ and $K_2O$ is present in an amount of at least 8 mol % without regard to alkaline earth oxides. In certain instances, it is believed that $K_2O$ and $Na_2O$ tend to decrease the liquidus temperature, thereby increasing the liquid viscosity. Further, in combination with $B_2O_3$ and $Al_2O_3$, $K_2O$ and $Na_2O$ tend to increase the liquidus viscosity.

In embodiments, the ratio of $K_2O$ to $Na_2O$ is from about 0.1 to about 0.75. In embodiments, the ratio of $K_2O$ to $Na_2O$ is about 0.15 to about 0.75, about 0.20 to about 0.75, about 0.25 to about 0.75, about 0.30 to about 0.75, about 0.35 to about 0.75, about 0.40 to abut 0.75, about 0.45 to about 0.75, about 0.50 to about 0.75, about 0.55 to about 0.75, about 0.60 to about 0.75, about 0.65 to about 0.75, about 0.70 to about 0.75, about 0.1 to about 0.70, abut 0.1 to about 0.65, about 0.1 to about 0.60, about 0.1 to about 0.55, about 0.1 to about 0.50, about 0.1 to about 0.45, about 0.1 to about 0.40, about 0.1 to about 0.35, about 0.1 to about 0.30, about 0.1 to about 0.25, about 0.1 to about 0.20, or about 0.1 to about 0.15.

In embodiments, the borosilicate glass composition comprises $P_2O_5$ in an amount in the range from 0 mol % to about 4 mol %, from about 1 mol % to about 4 mol %, from about 2 mol % to about 4 mol %, from about 3 mol % to about 4 mol %, from about 1 mol % to about 3 mol %, from about 2 mol % to about 3 mol %, from about 1 mol % to about 2 mol %, or any ranges and sub-ranges therebetween. $P_2O_5$ tends to lower the density of the borosilicate glass composition, which may result in increased densification during deformation as discussed below. Further, it is contemplated that $P_2O_5$ may increase the liquidus viscosity.

In embodiments, the borosilicate glass composition comprises CaO in an amount in the range from 0 mol % to about 5 mol %, from 0 mol % to about 4 mol %, from 0 mol % to about 3 mol %, from 0 mol % to about 2 mol %, from 0 mol % to about 1 mol %, from about 1 mol % to about 5 mol %, from about 2 mol % to about 5 mol %, from about 3 mol % to about 5 mol %, from about 4 mol % to about 5 mol %, from about 2 mol % to about 4 mol %, from about 2 mol % to about 3 mol %, from about 3 mol % to about 4 mol %, and all ranges and sub-ranges therebetween.

In embodiments, the borosilicate glass composition comprises MgO in an amount in the range from 0 mol % to about 5 mol %, in particular 0.5 mol % to 2.5 mol %. In various embodiments, the borosilicate glass composition comprises MgO in an amount in the range from 0 mol % to about 5 mol %, from 0 mol % to about 4 mol %, from 0 mol % to about 3 mol %, from 0 mol % to about 2 mol %, from 0 mol % to about 1 mol %, from about 1 mol % to about 5 mol %, from about 2 mol % to about 5 mol %, from about 3 mol % to about 5 mol %, from about 4 mol % to about 5 mol %, from about 2 mol % to about 4 mol %, from about 2 mol % to about 3 mol %, from about 3 mol % to about 4 mol %, and all ranges and sub-ranges therebetween.

In embodiments, the total amount of CaO and MgO is at most 5 mol %. In embodiments, the total amount of CaO and MgO is at least 1.5 mol % where the combined amount of $K_2O$ and $Na_2O$ are less than 7 mol %. Alkaline earth oxides, such as CaO and MgO, tend to reduce liquidus temperature and increase liquidus viscosity.

In embodiments, the borosilicate glass composition comprises $SnO_2$ in an amount up to about 0.25 mol %. In embodiments, the borosilicate glass composition comprises $SnO_2$ in an amount in the range from 0 mol % to about 0.25 mol %, from about 0.05 mol % to about 0.25 mol %, from about 0.10 mol % to about 0.25 mol %, from about 0.15 mol % to about 0.25 mol %, from about 0.20 mol % to about 0.25 mol %, from about 0.05 mol % to about 0.20 mol %, from about 0.05 mol % to about 0.15 mol %, from about 0.05 mol % to about 0.10 mol %, from about 0.10 mol % to about 0.15 mol %, from about 0.10 mol % to about 0.20 mol %, from about 0.15 mol % to about 0.20 mol %, or all ranges and sub-ranges therebetween. In some embodiments, $SnO_2$ may be substituted with another fining agent, such as a multivalent or other oxygen absorbing agent including antimony, arsenic, iron, cerium, and the like.

In embodiments, the borosilicate glass composition includes one or more iron compounds, e.g., in the form of iron (III) oxide ($Fe_2O_3$) or iron (II) oxide (FeO; provided, e.g., from an iron oxalate ($C_2FeO_4$) source), in particular in order to absorb infrared radiation from sunlight. In embodiments, the borosilicate glass composition comprises the iron compound in an amount up to about 0.50 mol %, in particular in a range from about 0.20 to about 0.40 mol %. In embodiments, the borosilicate glass composition comprises the iron compound in an amount in the range from about 0.03 mol % to about 0.50 mol %, from about 0.10 mol % to about 0.50 mol %, from about 0.15 mol % to about 0.50 mol %, from about 0.20 mol % to about 0.50 mol %, from about 0.25 mol % to about 0.50 mol %, from about 0.30 mol % to about 0.50 mol %, from about 0.35 mol % to about 0.50 mol %, from about 0.40 mol % to about 0.50 mol %, from about 0.45 mol % to about 0.50 mol %, or any ranges or sub-ranges therebetween. In other embodiments, other modifiers, such as $TiO_2$ can be used in addition to or in place of the iron compound to reduce transmission of UV radiation. In embodiments, $TiO_2$ can be provided in an amount of about 0.04 mol % to about 0.12 mol %.

In embodiments, the glass composition (or the glass article formed therefrom) exhibits a liquidus viscosity of at least 500 kiloPoise (kP) and up to 50,000 kP. Advantageously, glass compositions having a liquidus viscosity greater than 1000 kP are less susceptible to baggy warp during fusion draw. As used herein, the term "liquidus viscosity" refers to the viscosity of a molten glass at the liquidus temperature, wherein the term "liquidus temperature" refers to the temperature at which crystals first appear as a molten glass cools down from the melting temperature (or the temperature at which the very last crystals melt away as temperature is increased from room temperature).

The borosilicate glass compositions described herein having a liquidus viscosity of at least 500 kP are fusion formable at thicknesses of at least 2 mm, at least 3 mm, at least 3.3 mm, or at least 3.8 mm. In some embodiments, the fusion formed glass ply is substantially free of draw lines that are present in typical float formed glass articles. The liquidus viscosity is determined by the following method. First the liquidus temperature of the glass is measured in accordance with ASTM C829-81 (2015), titled "Standard Practice for Measurement of Liquidus Temperature of Glass by the Gradient Furnace Method." Next the viscosity of the glass at the liquidus temperature is measured in accordance with ASTM C965-96(2012), titled "Standard Practice for Measuring Viscosity of Glass Above the Softening Point."

In embodiments, the borosilicate glass composition exhibits a strain point temperature in a range from about 480° C. to about 560° C., about 490° C. to about 560° C., about 500° C. to about 560° C., about 510° C. to about 560° C., about 520° C. to about 560° C., about 530° C. to about 560° C., about 540° C. to about 560° C., about 550° C. to about 560° C., about 480° C. to about 550° C., about 480° C. to about 540° C., about 480° C. to about 530° C., about 480° C. to about 520° C., about 480° C. to about 510° C., about 480° C. to about 500° C., or any ranges or sub-ranges therebetween. In embodiments, the strain point temperature is determined using the beam bending viscosity method of ASTM C598-93(2013). In embodiments, the strain point is defined as the temperature at which viscosity is $10^{14.68}$ poise.

In embodiments, the borosilicate glass composition exhibits an annealing point temperature in a range from about 520° C. to about 590° C., about 530° C. to about 590° C., about 540° C. to about 590° C., about 550° C. to about 590° C., about 560° C. to about 590° C., about 570° C. to about 590° C., about 580° C. to about 590° C., about 520° C. to about 580° C., about 520° C. to about 570° C., about 520° C. to about 560° C., about 520° C. to about 550° C., about 520° C. to about 540° C., about 520° C. to about 530° C., or any ranges or sub-ranges therebetween. The annealing point is determined using the beam bending viscosity method of ASTM C598-93(2013). In embodiments, the annealing point is defined as the temperature at which viscosity is $10^{13.18}$ poise.

In embodiments, the glass composition exhibits a temperature at a viscosity of about 200 P ($T_{200P}$) that is at most 1725° C., as measured by Fulcher fit to high temperature viscosity (HTV) data (i.e., all the temperature measurements from 100 kP to 100 Poise). For example, the glass composition may exhibit a $T_{200P}$ in a range from about 1500° C. to about 1725° C., about 1525° C. to about 1725° C., about 1550° C. to about 1725° C., about 1575° C. to about 1725° C., about 1600° C. to about 1725° C., about 1625° C. to about 1725° C., about 1650° C. to about 1725° C., about 1675° C. to about 1725° C., about 1700° C. to about 1725° C., about 1500° C. to about 1700° C., about 1500° C. to about 1675° C., about 1500° C. to about 1650° C., about 1500° C. to about 1625° C., about 1500° C. to about 1600° C., about 1500° C. to about 1575° C., about 1500° C. to about 1550° C., about 1500° C. to about 1525° C., or any ranges or sub-ranges therebetween.

In one or more embodiments, the glass composition or the glass article formed therefrom exhibit a density at 20° C. that is less than 2.4 g/cm$^3$. In embodiments, the density at 20° C. is 2.39 g/cm$^3$ or less, 2.38 g/cm$^3$ or less, 2.37 g/cm$^3$ or less, 2.36 g/cm$^3$ or less, 2.35 g/cm$^3$ or less, 2.34 g/cm$^3$ or less, 2.33 g/cm$^3$ or less, 2.32 g/cm$^3$ or less, 2.31 g/cm$^3$ or less, 2.30 g/cm$^3$ or less, 2.29 g/cm$^3$ or less, 2.28 g/cm$^3$ or less, 2.27 g/cm$^3$ or less, 2.26 g/cm$^3$ or less, 2.25 g/cm$^3$ or less, 2.24 g/cm$^3$ or less, 2.23 g/cm$^3$ or less, 2.22 g/cm$^3$ or less, 2.21 g/cm$^3$ or less, or 2.20 g/cm$^3$ or less. In embodiments, the density is determined using the buoyancy method of ASTM C693-93(2013). Advantageously, a density below 2.4 g/cm$^3$ is less than the density of soda-lime glass, which is conventionally used in automotive glazing laminates.

Figure 7:
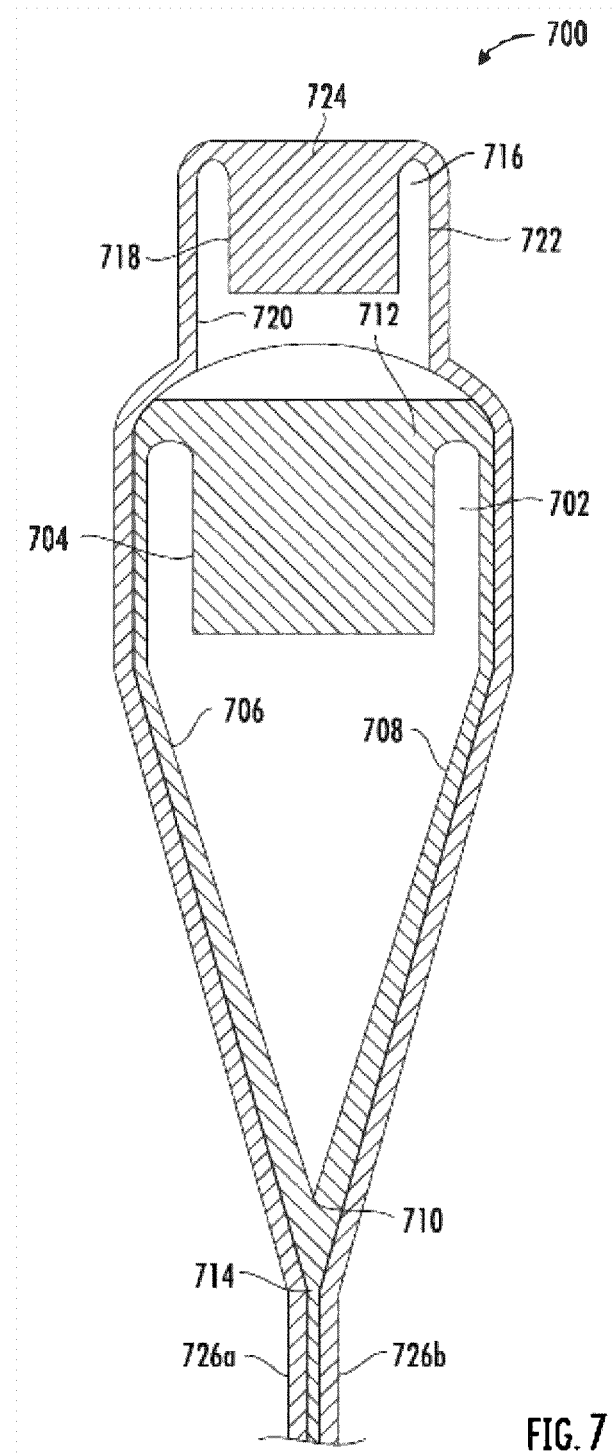
FIG. 7 depicts a fusion-forming apparatus for fusion forming a glass ply of borosilicate glass composition, according to an exemplary embodiment.

As mentioned, borosilicate glass composition according to the present disclosure is able to be fusion formed. The resulting glass ply can be described as being fusion-formed. FIG. 7 depicts an exemplary embodiment of an apparatus 700 for fusion forming a glass ply from a borosilicate glass composition. The fusion-forming apparatus 700 includes an isopipe 702 defined by a trough 704, a first forming surface 706, and a second forming surface 708. The first forming surface 706 and the second forming surface 708 angle inwardly beneath the trough 704 and meet at a root 710 of the isopipe 702. The presently disclosed borosilicate glass composition 712 is provided to the trough 704 in a molten state, and the borosilicate glass composition 712 overflows the trough 704, forming two streams and running down the forming surfaces 706, 708. The streams of molten glass meet at the root 710 to form the glass ply 714, which cools and is cut from the flowing stream.

In embodiments, the fusion-forming apparatus 700 includes a second isopipe 716 having a second trough 718, a third forming surface 720, and a fourth forming surface 722. A glass composition 724, having the same or different composition as the borosilicate glass composition 712, is provided to the second trough 718 in a molten state and overflows the second trough 718. The molten glass composition 724 flows down the third and fourth forming surfaces 720, 722 where it is directed outwardly around the borosilicate glass composition 712. In this way, the glass composition 724 flows down the first and second forming surfaces 706, 708 outside of the streams of the borosilicate glass composition 712. At the root 710 of the isopipe 702, the combination of the streams of the borosilicate glass composition 712 and the streams of the glass composition 724 create a glass ply 714 having cladding layers 726a, 726b. Such cladding layers may mechanically strengthen the glass based on residual stresses developed based on different coefficients of thermal expansions between the compositions 712, 724, or the cladding layers may be chemically strengthenable, such as through ion-exchange treatment. The cladding layers 726a, 726b may also provide other features, such as specific optical properties to the glass ply 714 formed in this manner.

The fusion forming method offers the advantage that, because the two glass steams flowing over the channel fuse together, neither of the outside surfaces of the resulting glass article comes in contact with any part of the apparatus. Thus, the surface properties of the fusion drawn glass article are not affected by such contact. In embodiments, the fusion-formed borosilicate glass composition of the present disclosure exhibits optical distortions of no greater than 75 millidiopters as measured by an optical distortion detector using transmission optics according to ASTM 1561. Conventional borosilicate glass compositions, which have a liquidus viscosity less than 500 kP and a $T_{200P}$ temperature of greater than 1725° C., were not able to be fusion formed at thicknesses of 2 mm or greater using a fusion draw process, and instead, such conventional borosilicate glass compositions of that thickness were typically formed using a float process.

EXAMPLES

Various embodiments of the fusion formable borosilicate glass composition are provided in the tables below.

Examples 1-6 are exemplary glass compositions according to one or more embodiments of this disclosure. As can be seen from Table 1, the liquidus viscosity of these glass compositions is well above the 500 kP necessary for fusion forming the glass composition. Further, $T_{200P}$ for these glasses is well below 1725° C. Also, advantageously, these glasses have a density below 2.4 g/cm$^3$. Conventional laminates utilize a thick outer glass ply of soda-lime glass, which has a density above 2.4 g/cm$^3$. Thus, not only are the mechanical properties enhanced as will be discussed below, but the disclosed fusion formable borosilicate glass composition offers weight savings (and thus enhanced fuel efficiency) based on its density of less than 2.4 g/cm$^3$, in particular 2.35 g/cm$^3$ or less. The thermal properties of a resulting glass ply are also enhanced by the low temperature coefficient of thermal expansion (LTCTE), which is obtained by measuring expansion of the glass between the temperatures of 0° C. and 300° C. In embodiments, the LTCTE is 5.6 ppm/° C. or less, in particular, 5.3 ppm/° C. or less, and particularly 5.1 ppm/° C. or less. Besides the properties just discussed, Table 1 also includes information related to strain point temperature, annealing point temperature, high temperature CTE (HTCTE), Young's modulus, and Poisson's ratio.

Table 2, below provides additional exemplary compositions according to the present disclosure.

TABLE 1

COMPOSITIONS AND PROPERTIES OF EXAMPLES 1-6

| | 1 | 2 | 3 | 4 | 5 | 6 |
|---|---|---|---|---|---|---|
| $SiO_2$ | 75.35 | 76.72 | 76.14 | 75.18 | 77.19 | 76.36 |
| $Al_2O_3$ | 3.54 | 3.54 | 3.54 | 4.07 | 4.04 | 4.07 |
| $B_2O_3$ | 12.21 | 10.75 | 11.31 | 12.01 | 9.84 | 10.86 |
| $Na_2O$ | 4.60 | 4.67 | 4.68 | 4.61 | 4.70 | 4.57 |
| $K_2O$ | 2.13 | 2.18 | 2.18 | 2.93 | 3.05 | 2.94 |
| MgO | 0.99 | 0.99 | 0.99 | 0.02 | 0.02 | 0.02 |
| CaO | 1.03 | 1.02 | 1.02 | 1.05 | 1.03 | 1.03 |
| $SnO_2$ | 0.14 | 0.13 | 0.13 | 0.13 | 0.13 | 0.14 |
| Density (g/cm$^3$) | 2.307 | 2.308 | 2.308 | 2.316 | 2.335 | 2.324 |
| Strain Point (° C.) | 512.6 | 518.6 | 516.7 | 515.2 | 528.0 | 520.7 |
| LTCTE (ppm/° C.) | 5.1 | 5.24 | 5.1 | 5.58 | 5.55 | 5.56 |
| HTCTE (ppm/° C.) | 25.44 | 25.26 | 24.79 | 24.52 | 24.6 | 24.58 |
| Young's Modulus (GPa) | 66.6 | 67.7 | 67.1 | 66.7 | 69.2 | 67.7 |
| Poisson's Ratio | 0.198 | 0.194 | 0.196 | 0.200 | 0.194 | 0.197 |
| Fulchers A | −1.531 | −1.342 | −1.536 | −1.163 | −1.159 | −1.152 |
| Fulchers B | 5661.3 | 5468.2 | 5817.5 | 4739.4 | 4858.6 | 4848.7 |
| Fulchers $T_0$ | 140.9 | 182.3 | 142.8 | 227.7 | 232.4 | 224.8 |
| 200 P Temp (° C.) | 1618 | 1683 | 1659 | 1596 | 1637 | 1629 |
| 35 kP Temp (° C.) | 1073 | 1111 | 1100 | 1058 | 1084 | 1076 |
| 200 kP Temp (° C.) | 970 | 1005 | 994 | 961 | 985 | 976 |
| Liquidus Viscosity (kP) | 947 | 672 | 1578 | 3779 | 2892 | 4013 |
| Phase | Cristobalite | Cristobalite | Cristobalite | Cristobalite | Cristobalite | Cristobalite |

TABLE 2

COMPOSITIONS AND PROPERTIES OF EXAMPLES 7-9 AND
COMPARATIVE EXAMPLES 10 AND 11

|  | 7 | 8 | 9 | CE10 | CE11 |
|---|---|---|---|---|---|
| $SiO_2$ | 76.75 | 75.93 | 76.38 | 76.10 | 76.25 |
| $Al_2O_3$ | 3.57 | 3.53 | 3.56 | 3.53 | 3.52 |
| $B_2O_3$ | 11.18 | 11.61 | 12.26 | 8.47 | 11.49 |
| $Na_2O$ | 6.35 | 4.59 | 4.87 | 6.50 | 8.73 |
| $K_2O$ | 2.04 | 2.13 | 1.01 | 2.15 | 0.00 |
| MgO | 0.00 | 0.03 | 1.81 | 0.06 | 0.00 |
| CaO | 0.01 | 2.05 | 0 | 3.08 | 0.01 |
| $SnO_2$ | 0.11 | 0.11 | 0.11 | 0.11 | 0.00 |
| Density (g/cm³) | 2.328 | 2.32 | 2.273 | 2.385 | 2.332 |
| Strain Point (° C.) | 518.6 | 525.8 | 506.2 | 543 | 526.6 |
| Anneal Point (° C.) | 564 | 571.4 | 552.9 | 585.4 | 569.7 |
| LTCTE (ppm/° C.) | 5.6 | 5.15 | 4.58 | 6.09 | — |
| Young's Modulus (GPa) | 68.7 | 68.3 | 63.1 | 74.1 | — |
| Poisson's Ratio | 0.192 | 0.192 | 0.196 | 0.194 | — |
| Fulchers A | −1.121 | −0.974 | −1.682 | −1.272 | −1.023 |
| Fulchers B | 4505.1 | 4545.6 | 6535.2 | 4696.1 | 4178.6 |
| Fulchers $T_0$ | 255.8 | 251.8 | 69 | 240.1 | 279.4 |
| 200 P Temp (° C.) | 1572 | 1640 | 1710 | 1555 | 1536 |
| 35 kP Temp (° C.) | 1051 | 1076 | 1119 | 1048 | 1030 |
| 200 kP Temp (° C.) | 957 | 976 | 1005 | 955 | 940 |
| Liquidus Viscosity (kP) | 582 | 855 | 1365 | 308 | 180 |
| Phase | Cristobalite | Cristobalite | Cristobalite | Cristobalite | Cristobalite |

Again, from Table 2, it can be seen that Examples 7-9 of the disclosed fusion formable borosilicate glass compositions exhibit the properties necessary for fusion forming at thicknesses greater than 2 mm. Further, the properties of the borosilicate glass composition are advantaged over the same properties of soda-lime glass, such as density and LTCTE. However, as can be seen from Comparative Examples 10 and 11, compositions outside of those disclosed herein with respect to fusion formability do not have the properties necessary for fusion forming at relatively large thicknesses. Comparative Example 10 has a low $B_2O_3$ content of 8.47 mol % such that the total amount of $SiO_2$, $B_2O_3$, and $Al_2O_3$ is below 90 mol, and Comparative Example 11 contains none of $K_2O$ or MgO and almost none of CaO, which tend to increase the liquidus viscosity as discussed above. However, as discussed later, some embodiments may be useful as windshields or other articles, such as due to fracture behavior, regardless of whether the respective composition is fusion formable.

Table 3, below, provides further exemplary compositions for the borosilicate glass composition according to the present disclosure.

TABLE 3

COMPOSITIONS OF EXAMPLES 12-14 AND 18
AND COMPARATIVE EXAMPLES 15-17

|  | 12 | 13 | 14 | CE15 | CE16 | CE17 | 18 |
|---|---|---|---|---|---|---|---|
| $SiO_2$ | 76.34 | 76.06 | 76.15 | 76.19 | 76.23 | 76.09 | 74.89 |
| $Al_2O_3$ | 3.56 | 3.54 | 3.54 | 3.55 | 3.55 | 3.54 | 3.50 |
| $B_2O_3$ | 11.80 | 12.43 | 12.89 | 13.35 | 13.73 | 14.28 | 13.60 |
| $Na_2O$ | 4.29 | 4.15 | 3.85 | 3.55 | 3.33 | 3.12 | 5.22 |
| $K_2O$ | 1.96 | 1.95 | 1.80 | 1.65 | 1.58 | 1.51 | 0.92 |
| MgO | 0.95 | 0.86 | 0.82 | 0.77 | 0.71 | 0.66 | 1.76 |
| CaO | 0.99 | 0.90 | 0.86 | 0.82 | 0.76 | 0.70 | — |
| $SnO_2$ | 0.10 | 0.10 | 0.10 | 0.10 | 0.10 | 0.10 | 0.11 |
| Density (g/cm³) | 2.298 | 2.285 | 2.271 | 2.259 | 2.246 | 2.234 | 2.273 |
| Strain Point (° C.) | 512.7 | 511.1 | 506.6 | 499.8 | 499 | 492 | 504 |
| Anneal Point (° C.) | 558.7 | 558.2 | 554.9 | 549.7 | 549.2 | 543.5 | 546 |
| LTCTE (ppm/° C.) | 4.8 | 4.6 | 4.5 | 4.4 | 4.3 | 4.1 | 4.6 |
| Young's Modulus (GPa) | 65.9 | 64.6 | 63.0 | 61.4 | 60.2 | 58.8 | — |
| Poisson's Ratio | 0.196 | 0.2 | 0.2 | 0.201 | 0.202 | 0.203 | — |
| Fulchers A | −1.504 | −1.647 | −1.835 | −1.719 | −2.093 | −1.727 | −1.697 |
| Fulchers B | 5948 | 6341.6 | 7018.7 | 6898.6 | 7963.1 | 7172.3 | 6442.7 |

TABLE 3-continued

COMPOSITIONS OF EXAMPLES 12-14 AND 18 AND COMPARATIVE EXAMPLES 15-17

| | 12 | 13 | 14 | CE15 | CE16 | CE17 | 18 |
|---|---|---|---|---|---|---|---|
| Fulchers $T_0$ | 111.3 | 89.1 | 21.2 | 33 | −55.1 | 13.3 | 73.7 |
| $T_{200\,P}$ (° C.) | 1676 | 1695 | 1718 | 1749 | 1757 | 1794 | 1685 |
| $T_{35kp}$ (° C.) | 1097 | 1113 | 1121 | 1134 | 1145 | 1157 | 1106 |
| $T_{200kP}$ (° C.) | 987 | 1002 | 1005 | 1016 | 1022 | 1034 | 994 |
| Liquidus Viscosity (kP) | 1021 | 1197 | 1752 | | | | 4569 |
| Phase | Cristobalite | Cristobalite | Cristobalite | | | | Cristobalite |

The borosilicate glass compositions Examples 12-14 and 18 in Table 3 possess the requisite liquid viscosity and $T_{200P}$ temperature for fusion forming and also the advantaged properties of density and LTCTE for using the disclosed borosilicate glass composition as an outer ply in automotive glazing laminates. Moreover, as can be seen, these examples demonstrate that the increasing amount of $B_2O_3$ has the effect of decreasing density. Each of Examples 12-17 has a density of less than 2.3 g/cm³, and certain examples, have a density of 2.250 g/cm³ or less. Comparative Examples 15-17 exhibit a $T_{200P}$ temperature that is above 1725° C. In comparison to Examples 12-14 and 18, Comparative Examples 15-17 have too little alkali oxides and too little alkali and alkali earth oxides (also called alkaline earth metal oxides), such as for some of the fusion formability attributes disclosed herein, but may have sufficient akali and alkaline earth metal oxides for other embodiments, such as windshields and other articles with loop cracks that contain lateral and radial cracks from a Vickers indenter, as discussed below. In particular, each of Examples 12-14 and 15 include at least 5.5 mol % of $Na_2O+K_2O$ and a total of at least 7.0 mol % of $Na_2O+K_2O+MgO+CaO$. From the examples in Tables 1-3, it is believed that embodiments of the present disclosure will exhibit the requisite $T_{200P}$ and liquidus viscosity for fusion forming where a total amount of $Na_2O+K_2O+MgO+CaO$ is at least 7.0 mol %, especially where there is at least 5.5 mol % of $Na_2O+K_2O$ and at least 1.5 mol % of MgO+CaO. It is further believed that embodiments of the present disclosure will exhibit the requisite $T_{200P}$ and liquidus viscosity for fusion forming where $Na_2O+K_2O$ is at least 8 mol % without regard to the amount of MgO and CaO.

Table 4 provides additional exemplary compositions of the disclosed borosilicate glass composition with the further addition of an iron compound (e.g., as iron (II) oxide or iron (III) oxide) to absorb sunlight, in particular infrared (IR) radiation, which causes the temperature of the vehicle interior to rise. Thus, by providing IR absorption, an automotive glazing comprising a laminate with an outer ply of the disclosed borosilicate glass composition is able to provide additional fuel efficiency and comfort by reducing the heat that builds up in the vehicle and the burden on the air cooling system. Table 4 provides example borosilicate glass compositions of Table 4 having amounts of iron ($Fe_2O_3$) increasing from 0 mol % to 0.44 mol % and one composition (Example 25) containing primarily iron (II) oxide (FeO) as the primary iron compound. In Example 25, the iron (II) oxide is provided by using iron oxalate ($C_2FeO_4$) as a batch material source. The carbon of the iron oxalate leaves as carbon dioxide ($CO_2$), leaving primarily iron (II) oxide and some iron (III) oxide in the glass.

TABLE 4

COMPOSITIONS AND OPTICAL PROPERTIES OF EXAMPLES 19-25

| | 3 | 19 | 20 | 21 | 22 | 23 | 24 | 25 |
|---|---|---|---|---|---|---|---|---|
| $SiO_2$ | 76.14 | 76.00 | 76.16 | 76.06 | 76.04 | 76.22 | 75.93 | 75.68 |
| $Al_2O_3$ | 3.54 | 3.53 | 3.54 | 3.53 | 3.54 | 3.55 | 3.52 | 3.51 |
| $B_2O_3$ | 11.31 | 11.58 | 11.41 | 11.26 | 11.34 | 11.25 | 11.29 | 12.55 |
| $Na_2O$ | 4.68 | 4.58 | 4.52 | 4.65 | 4.57 | 4.45 | 4.57 | 4.2 |
| $K_2O$ | 2.18 | 2.11 | 2.12 | 2.18 | 2.11 | 2.07 | 2.14 | 2.05 |
| MgO | 0.99 | 0.98 | 0.97 | 0.97 | 0.98 | 0.98 | 0.98 | 0.85 |
| CaO | 1.02 | 1.01 | 1.03 | 1.03 | 1.03 | 1.02 | 1.03 | 0.9 |
| $Fe_2O_3$/FeO | — | 0.07 | 0.15 | 0.22 | 0.28 | 0.37 | 0.44 | 0.16 |
| $SnO_2$ | 0.13 | 0.11 | 0.11 | 0.11 | 0.11 | 0.10 | 0.10 | 0.1 |
| Refractive Index at 633 nm | 1.4855 | 1.4855 | 1.4855 | 1.4855 | 1.4855 | 1.4855 | — | 1.484 |

Figure 8:
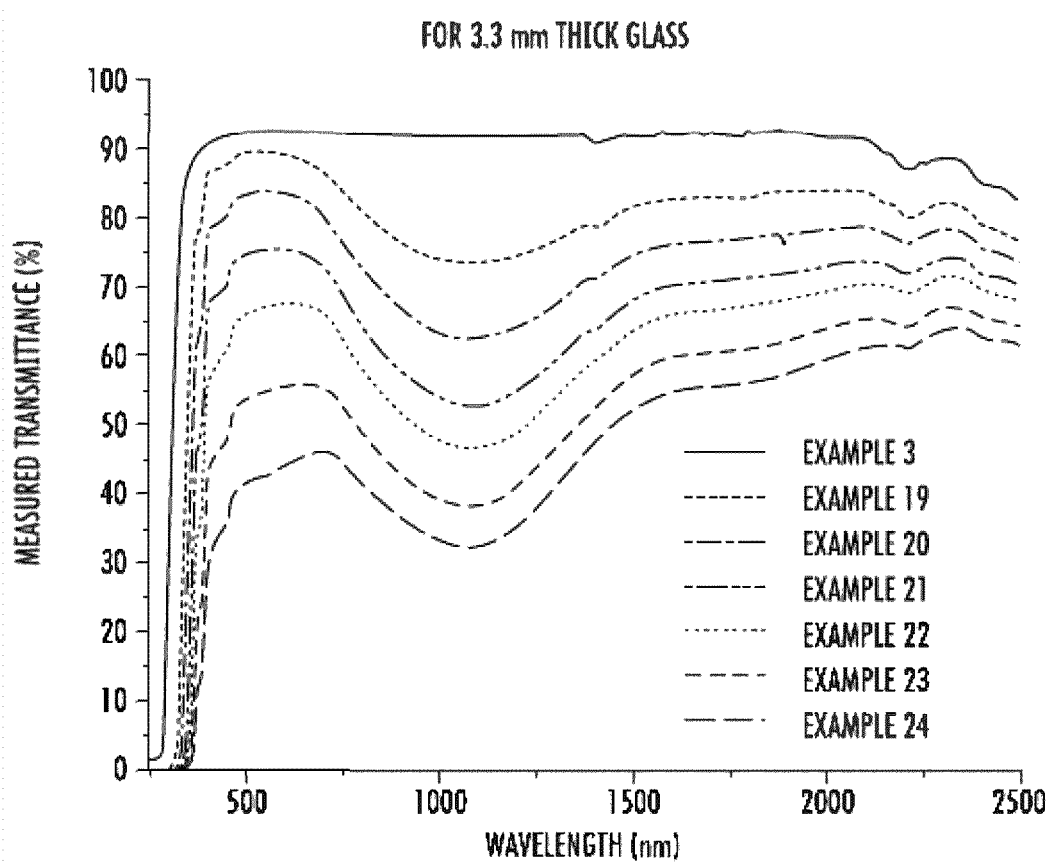
FIG. 8 depicts a graph of solar transmittance for various borosilicate glass compositions, according to exemplary embodiments.

Tables 5 and 6, below, provide transmission data for the borosilicate glass compositions of Table 4 for glass plies having a thickness of 3.3 mm and 2.1 mm, respectively. In embodiments, for a given composition of borosilicate glass composition, the addition of an iron compound serves to lower the visible light (i.e., about 400 nm to about 750 nm), total solar transmission, and UV transmission. All transmission values were measured at normal incidence. Example 3 has a visible light transmission ($T_{VIS}$) of 92.4% and a total solar transmission (TTS) of 92.0% as measured according to ISO 13837A (A/2°). By adding increments of $Fe_2O_3$, $T_{VIS}$ and TTS are reduced incrementally. As shown in Table 4, the addition of 0.07 mol % (or 0.19 wt %) $Fe_2O_3$ drops $T_{VIS}$ by about 3% and TTS by about 6%. The addition of 0.37 mol % (or 0.92 wt %) of $Fe_2O_3$ drops $T_{VIS}$ by about 44% and TTS by about 33%. According to ISO 13837, the minimum requirement for $T_{VIS}$ is 73% for glazing of road vehicles. FIG. 8 provides a graph of transmittance for Examples 3, 19-24. As can be seen, the addition of $Fe_2O_3$ lowers overall measured transmittance and creates a significant dip in measured transmittance between about 750 nm and 1500 nm, corresponding to the near infrared spectrum. In embodiments, an automotive glazing comprising a laminate 300, 400 including at least one glass ply of the presently disclosed fusion formable borosilicate glass composition has a TTS of 61% or less and/or a $T_{VIS}$ of at least 73% as measured according to ISO 13837A (A/2°). In such embodiments, the inventors believe from prior experience preparing such glazings and laminates that the interlayer and other glass ply will have minimal effect on $T_{VIS}$ (e.g., up to about 0.5% diminishment) and would further reduce TTS by, e.g., 3-5%. This is especially so where the presently disclosed fusion formable borosilicate glass ply is used as a thicker out ply of the laminate glazing.

TABLE 5

TRANSMISSION PROPERTIES BASED ON IRON CONTENT FOR 3.3. MM GLASS

| Glass Composition | Fe Source | Fe level (wt %) | UV cutoff wavelength (nm) | $T_{UV}$ (300-380 nm) (%) | $T_{VIS}$ (%) | TTS (%) |
|---|---|---|---|---|---|---|
| 3 | Oxide | 0 | <300 | 85.7 | 92.4 | 92.0 |
| 19 | Oxide | 0.19 | 320 | 59.2 | 89.3 | 85.7 |
| 20 | Oxide | 0.37 | 335 | 39.1 | 83.6 | 80.1 |
| 21 | Oxide | 0.55 | 345 | 26.7 | 75.7 | 74.2 |
| 22 | Oxide | 0.70 | 350 | 17.6 | 67.6 | 69.4 |
| 23 | Oxide | 0.92 | 365 | 6.1 | 48.8 | 59.2 |
| 24 | Oxide | 1.1 | — | — | 44.2 | 56.3 |
| 25 | Oxalate | 0.40 | 330 | 42.2 | 79.6 | 73.8 |

Figure 10:
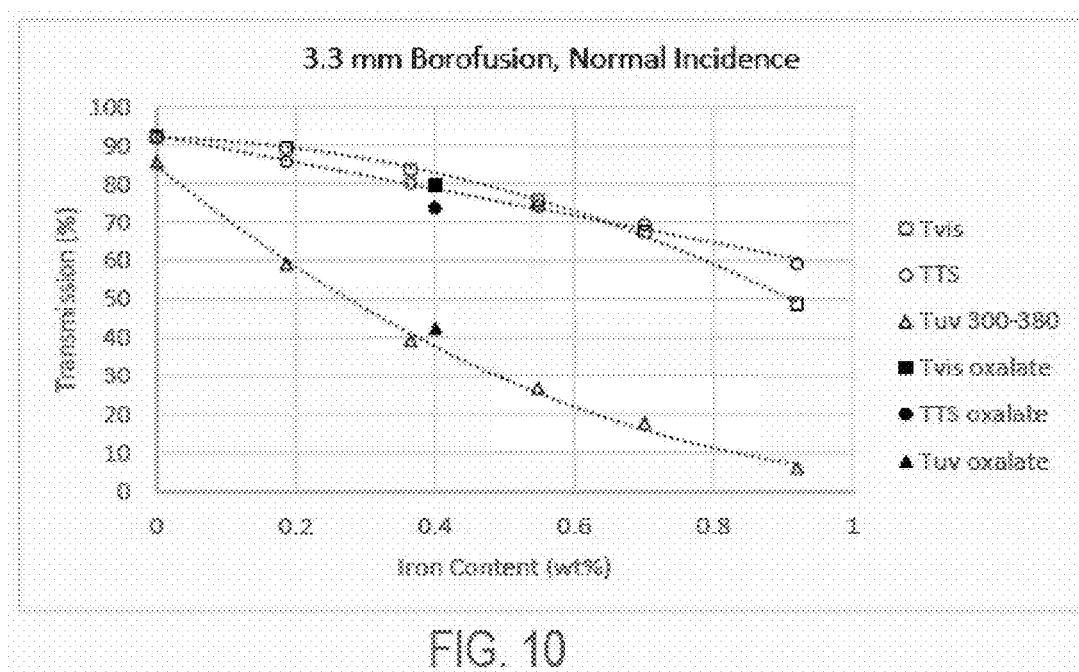
FIGS. 10 and 11 depict plots of visible, total solar, and ultraviolet light transmission as a function of iron content in glass, according to exemplary embodiments.

As can also be seen in Table 5, increasing the iron content increases the UV cutoff wavelength (i.e., the wavelength where UV transmission goes below 10%) and decreases total UV transmission in the range of 300-380 nm in addition to decreasing $T_{VIS}$ and TTS. In Example 3, the glass composition contains no iron content. The UV cutoff wavelength is below 300 nm, and the UV transmission is 85.7%. As the iron content increases from 0 wt % (or 0 mol %) to 0.92 wt % (or 0.37 mol %), the UV cutoff wavelength increases to 365 nm and the $T_{UV}$ decreases to 6.1%. In addition to the $T_{VIS}$ and TTS requirements referenced above, embodiments of a laminate 300, 400 including at least one glass ply the presently disclosed fusion formable borosilicate glass composition have a $T_{UV}$ that is less than 75%. Advantageously, decreasing UV transmission in a laminate can help to reduce yellowing of the polymer interlayer. FIG. 10 depicts plots of the $T_{VIS}$, $T_{UV}$, and TTS for Examples 3, 19-23, and 25 as a function of iron content for a single glass ply based on the data contained in Table 5.

Figure 11:
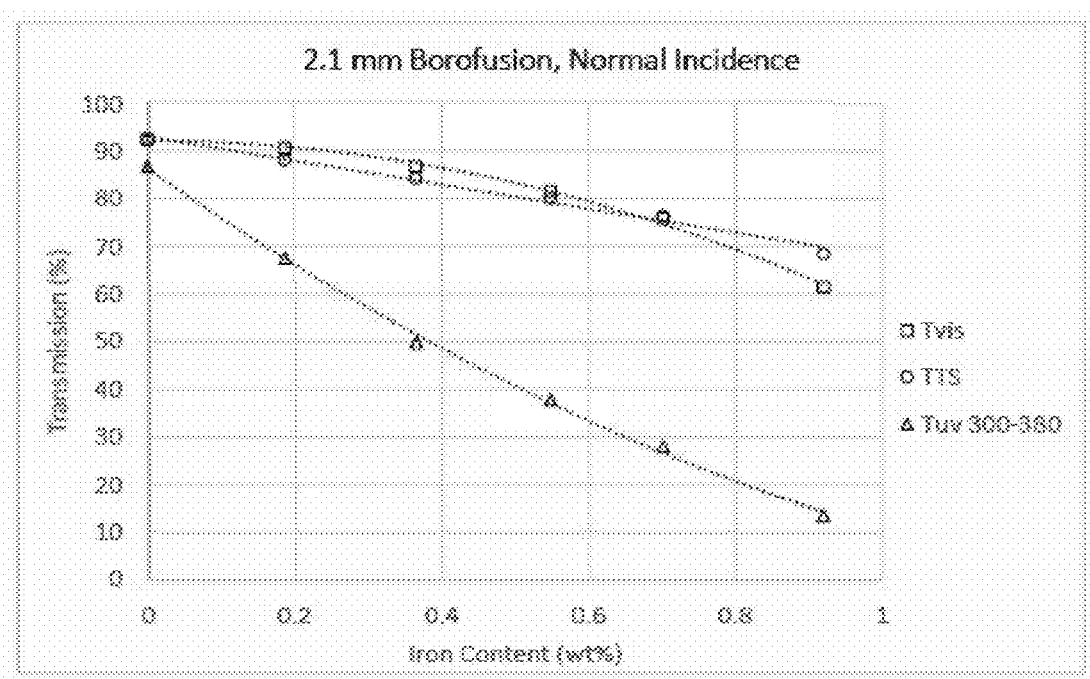

Table 6 provides transmission data for glass plies of the same compositions contained in Table 5 (with the exception of Example 24, which was not included). However, the thickness of the glass plies was decreased from 3.3 mm to 2.1 mm. As can be seen in Table 6, the decrease in ply thickness causes a slight decrease in the UV cutoff wavelength, and the $T_{UV}$, $T_{VIS}$, and TTS are each increased from the thicker 3.3 mm plies of Table 5. However, Table 6 still demonstrates that the $T_{UV}$, $T_{VIS}$, and TTS still decrease progressively with increasing iron content. FIG. 11 depicts plots of the $T_{VIS}$, $T_{UV}$, and TTS as a function of iron content for a single glass ply based on the data contained in Table 6. From Tables 5 and 6, it can also be seen that the iron (II) oxide from the iron oxalate provided to the batch provides a similar or better level of UV and solar radiance absorption than the iron (III) oxide when considered on a weight percentage basis.

TABLE 6

TRANSMISSION PROPERTIES BASED ON IRON CONTENT FOR 2.1 MM GLASS

| Glass Composition | Fe source | Fe level (wt %) | UV cutoff wavelength (nm) | $T_{UV}$ (300-380 nm) (%) | $T_{VIS}$ (%) | TTS (%) |
|---|---|---|---|---|---|---|
| 3 | Oxide | 0 | <300 | 86.7 | 92.4 | 92.2 |
| 19 | Oxide | 0.19 | 315 | 67.5 | 90.5 | 88.0 |
| 20 | Oxide | 0.37 | 330 | 49.7 | 86.7 | 84.2 |
| 21 | Oxide | 0.55 | 335 | 37.8 | 81.5 | 80.0 |
| 22 | Oxide | 0.70 | 340 | 28.1 | 75.8 | 76.4 |
| 23 | Oxide | 0.92 | 355 | 13.5 | 61.5 | 68.4 |
| 25 | Oxalate | 0.40 | 320 | 53.5 | 84.1 | 79.6 |

Figure 12:
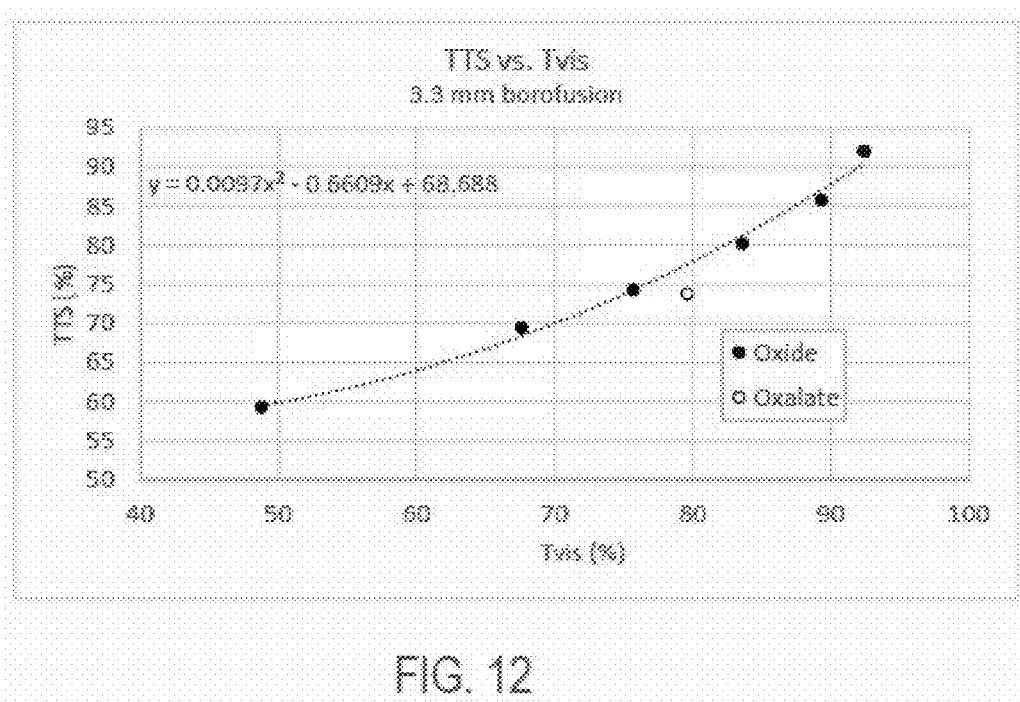
FIGS. 12 and 13 depict plots of visible light transmission against total solar transmission for glass compositions, according to exemplary embodiments.
Figure 13:
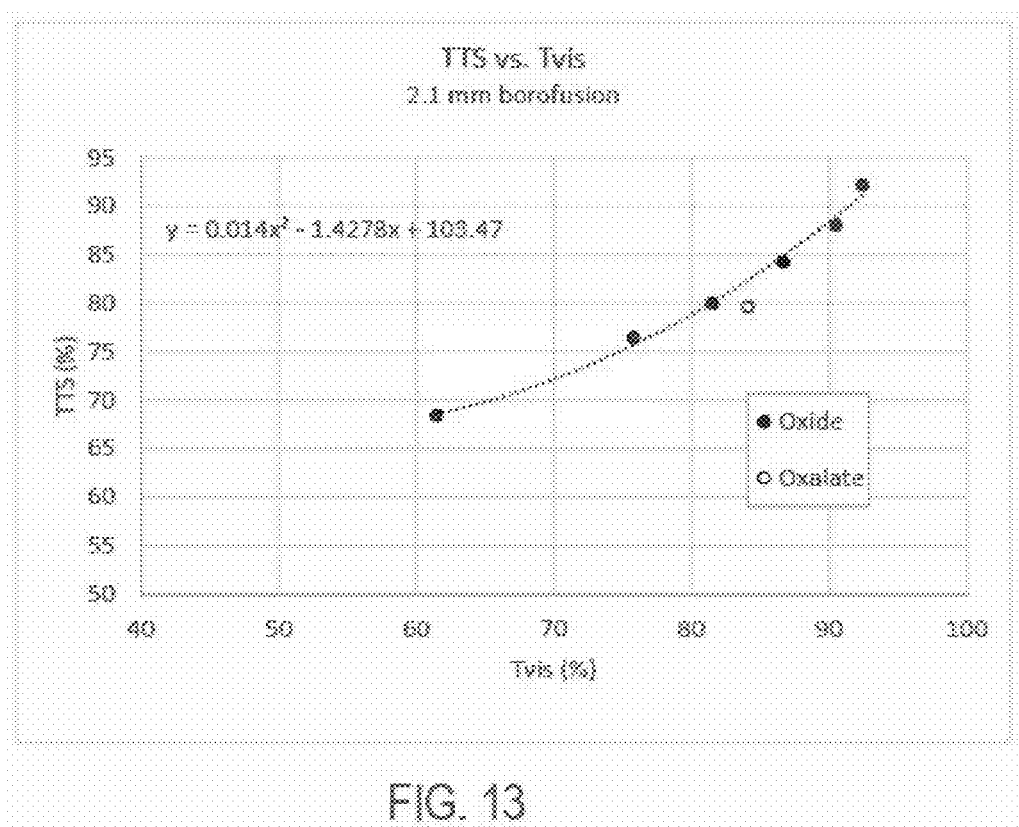

FIGS. 12 and 13 depict graphs plotting TTS against $T_{VIS}$ for the glass compositions contained in Tables 5 and 6. As can be seen in FIGS. 12 and 13, the iron content increases as the plot points go from the upper right to the lower left, defining a quadratic relationship. In FIG. 12, the relationship between $T_{VIS}$ and TTS is given by the equation TTS=0.0097 $(T_{VIS})^2-0.6609(T_{VIS})+68.688$. In FIG. 13, the relationship between $T_{VIS}$ and TTS is given by the equation TTS=0.014 $(T_{VIS})^2-1.4278(T_{VIS})+103.47$. It is believed that using iron oxalate as a source material for the iron compound of the borosilicate glass may shift the curves to the right, increasing the $T_{VIS}$ for the same level of TTS.

Figure 9:
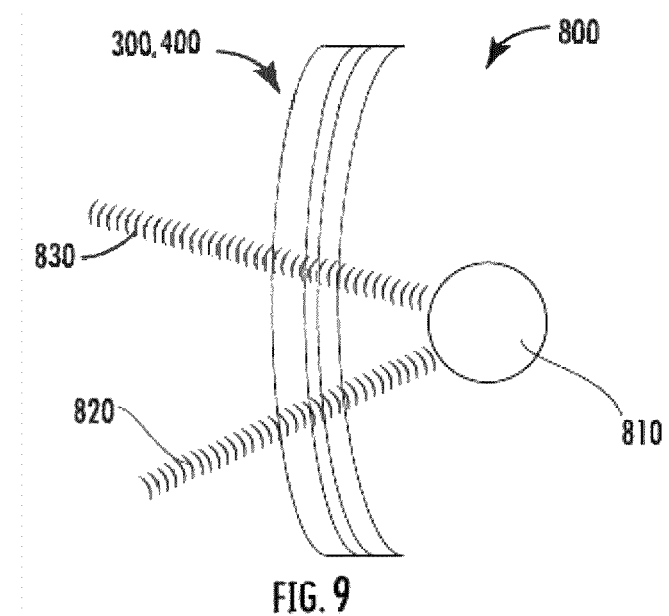
FIG. 9 depicts a system including a sensor configured to send and receive signals through a glass laminate having at least one glass ply made of the borosilicate glass composition, according to an exemplary embodiment.

In embodiments, the laminates 300, 400 described herein may be used in a system 800 that also includes a sensor 810 as shown in FIG. 9. In particular, the previous discussion demonstrates that the laminates 300, 400 transmit electromagnetic radiation in the visible spectrum, and as shown in FIG. 8, the laminates also substantially transmit electromagnetic radiation at wavelengths greater than 1500 nm (e.g., short-wave infrared). Signals carried on electromagnetic radiation in these ranges can be transmitted through the laminates 300, 400. FIG. 9 depicts the sensor 810 receiving incoming signals 820 and sending outgoing signals 830 through the laminates 300, 400. For example, in one or more embodiments, the laminate 300, 400 is included as glazing 130 in a vehicle 100 as depicted in FIG. 1. In such an embodiment, the sensor 810 is arranged on the interior of the vehicle 100. In this way, signals 820, 830 are able to be sent from and received by the vehicle 100. In one or more embodiments, the signals 820, 830 have a peak wavelength in the visible light (about 400 nm to about 750 nm) or short-wave infrared spectrums (1500 nm or greater). In embodiments, such signals facilitate autonomous or semi-autonomous driving of the vehicle, open road tolling, telecommunication, traffic monitoring and control, and vehicle-to-vehicle communication, amongst other possibilities. An example of a sensor 810 that can be utilized in the system 800 is LIDAR utilizing one or both of visible light or short-wave infrared radiation. In embodiments of the laminate 300, 400 that include an IRR coating, the IRR coating may be ablated from the ply on which it is applied in the region where the sensor 810 is configured to receive and send signals through the laminate 300, 400.

As mentioned above, the presently disclosed borosilicate glass composition has surprisingly improved deformation properties as compared to conventional soda-lime glass compositions and even to conventional borosilicate glass compositions. In particular, the inventors found that glass plies formed from borosilicate glass compositions disclosed herein surprisingly and unexpectedly densify upon deformation, which can limit the spread of radial cracks produced by, e.g., rocks and other flying debris from the roadway.

Figure 5A:
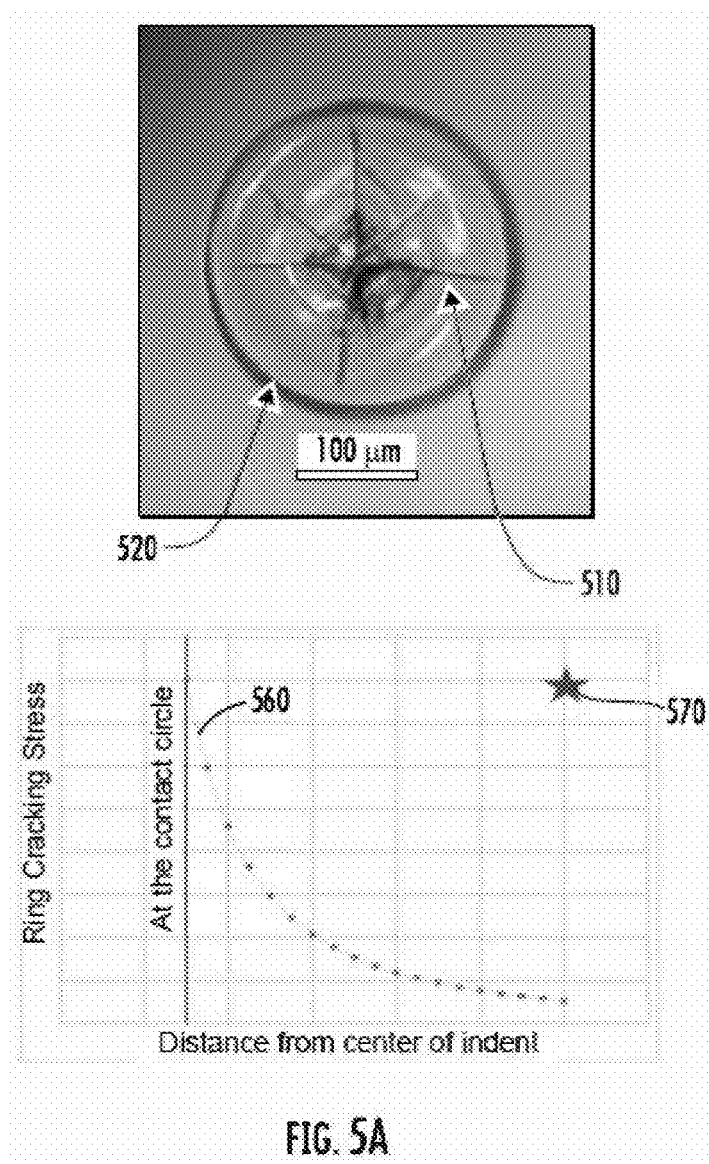
FIGS. 5A-5C depict micrographs of cracks resulting from of an indentation test, as well as graphs related thereto, for the disclosed fusion formed borosilicate glass composition (FIG. 5A), a comparative soda-lime glass composition (FIG. 5B), and a comparative float formed borosilicate glass composition (FIG. 5C)
Figure 5B:
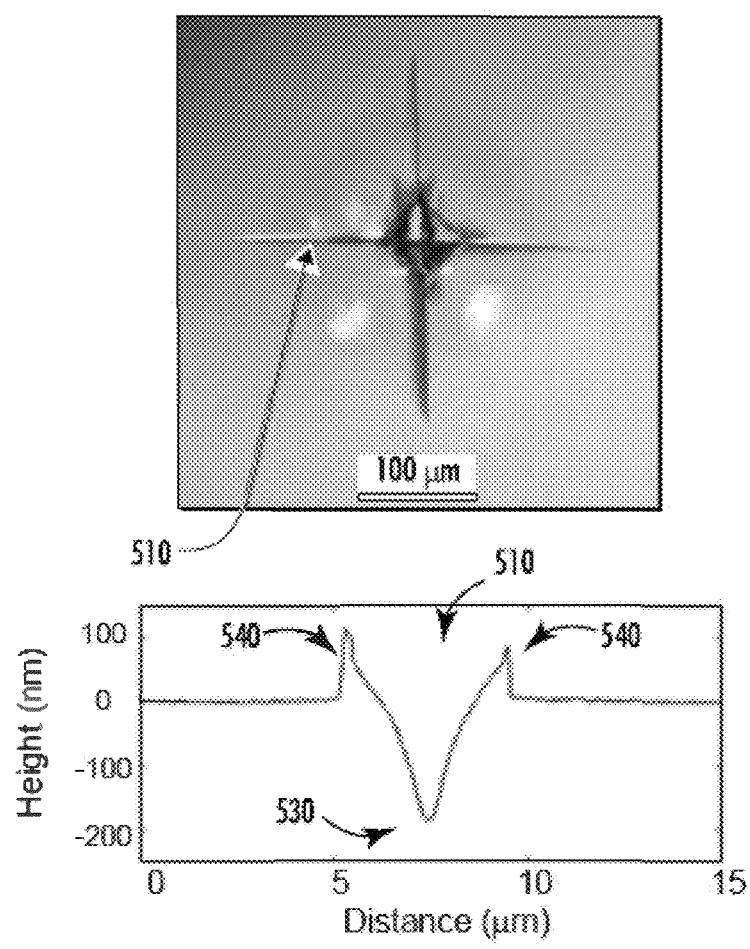
Figure 5C:
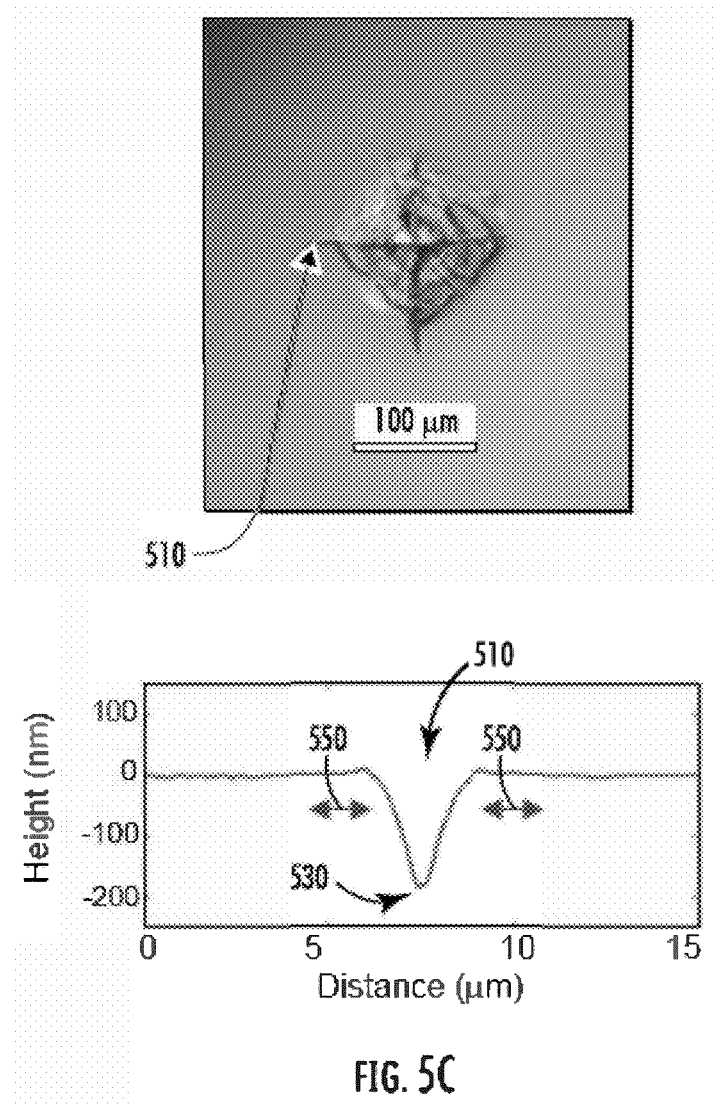

FIGS. 5A-5C depict crack formation produced by quasi static indents made using a 2 kilogram force (kgf) with a Vickers indentation tip for glass plies made from the presently disclosed borosilicate glass composition (FIG. 5A), a conventional soda lime silicate glass composition (FIG. 5B), and a conventional borosilicate glass composition (FIG. 5C). It is believed that the quasi-static indentation test using a Victers tip provides a good indication of windshield performance when an outer surface of the windshield is struck by flying debris, such as a rock.

In the test, a more conventional borosilicate glass composition with respect to formability included 83.60 mol % $SiO_2$, 1.20 mol % $Al_2O_3$, 11.60 mol % $B_2O_3$, 3.00 mol % $Na_2O$, and 0.70 mol % $K_2O$. This conventional borosilicate glass composition had a density of 2.23 g/cm$^3$, a strain point of 518° C., an anneal point of 560° C., an LTCTE of 3.25 μm/° C., a Young's modulus of 64 GPa, and a Poisson's ratio of 0.2. Thus, as compared to embodiments of the presently disclosed borosilicate glass composition, the conventional borosilicate glass composition includes less $Al_2O_3$, less total alkali content, especially $K_2O$, and less total alkaline earth content. Such conventional borosilicate glass compositions may be ployed in contexts where low coefficient of thermal expansion (e.g., 3.3 ppm/° C. or less) is desired. Alkali and Alkaline earth oxides tend to increase the coefficient of thermal expansion. Here, the slight increase in coefficient of thermal expansion to about 5-6 ppm/° C. is balanced against the ability to fusion form the presently disclosed borosilicate glass composition by increasing the liquidus viscosity and decreasing the $T_{200P}$ temperature. Further, as will be discussed below, the disclosed borosilicate glass composition had surprising and unexpected effects on the facture properties of glass plies made from the borosilicate glass composition.

As can be seen in FIGS. 5A-5C, each glass composition exhibits radial cracks 510 extending outwardly from the point where the Vickers indentation tip was pressed into the respective plies. However, as shown in FIG. 5A, the glass ply of the presently disclosed borosilicate glass composition exhibits a ring crack 520 formation that bounds the radial cracks 510 and preventing their further growth. In particular, the radial cracks 510 will not continue to extend radially because the radial cracks 510 are likely (e.g., more likely than not, statistically more likely, at least 51% likely, such as at least 60% likely, at least 80% likely out of sample size of 100) to be stopped and not traverse (e.g., are interrupted by) the ring crack 520. Advantageously, by limiting the spread of the radial cracks 510, the effect on the overall strength of the glass ply (which would be to decrease the strength) is reduced.

The graphs in FIGS. 5B and 5C demonstrate the topography of a line section of the cracks shown in the micrographs of FIGS. 5B and 5C. As can be seen in FIG. 5B, the radial crack 510 has a valley 530 at the center of the graph where the depth below the surface is the deepest. For the soda lime silicate glass of FIG. 5B, the structure of the glass provides relatively reduced free volume, and the broken glass networks shear under sharp contact, which causes the surface to pile-up to peaks 540. Hence, as shown in the micrograph of FIG. 5B, the surface around the radial cracks 510 is mounded.

For the conventional borosilicate glass composition of FIG. 5C, there is relatively higher free volume than the soda lime silicate glass and highly connected networks in the glass structure, which preferentially densifies under sharp contacts. The radial crack 510 still includes a central valley 530 at the center of the graph, but there are no substantial peaks at the edges of the radial crack 510 as the densification of the structure (as denoted by arrows 550) conserves volume, resulting in high ring stress that produces the cluster of ring cracks shown in the micrograph of FIG. 5C.

Returning to FIG. 5A, a contrast can be seen between the conventional borosilicate glass composition of FIG. 5C and the presently disclosed borosilicate glass composition. In the graph of FIG. 5A, the ring cracking stress is shown as a function of distance from the contact circle of the indenter. For the conventional borosilicate glass composition (denoted by curve 560), the ring stress decreases as the distance from the contact circle increases, which places the maximum ring cracking stress at the periphery of the contact circle. However, for the presently disclosed borosilicate glass composition, stress field analysis of the cracks of FIGS. 5A and 5C demonstrates that the maximum ring cracking stress (denoted by star 570) is surprising and unexpectedly spaced a distance away from the periphery of the contact circle. By forming a ring at a distance removed from the crack boundary, strength limiting median and radial cracks 510 are contained within the ring crack 520 for the presently disclosed borosilicate glass composition.

While the Vickers indentation test considers a quasi-static load (i.e., where the load is applied slowly such that the inertial effects of loading are negligible), it was also found using a Vickers dart drop test that the fusion-formed borosilicate glass composition performed as well as conventional float-formed borosilicate glass and better than soda-lime silicate glass when exposed to a dynamic load. In the Vickers dart drop test, a dart having a Vickers indentation tip (136°) and a weight of 8.6 g was dropped from increasing heights (50 mm increments) until a visible crack (i.e., crack having a length of at least 10 mm) was formed in the glass ply. The soda-lime silicate glass had an average height of visible crack formation of less than 600 mm. The presently disclosed borosilicate glass had an average height before visible crack formation of over 600 mm, in particular over 650 mm, which is about the same as would be expected from conventional borosilicate glass compositions. It is believed that the dart-drop test provides an indication of the contact rate and force needed for radial crack formation to exceed the ability of the glass to densify for the formation of ring cracks in the presently disclosed borosilicate glass composition.

Figure 6A:
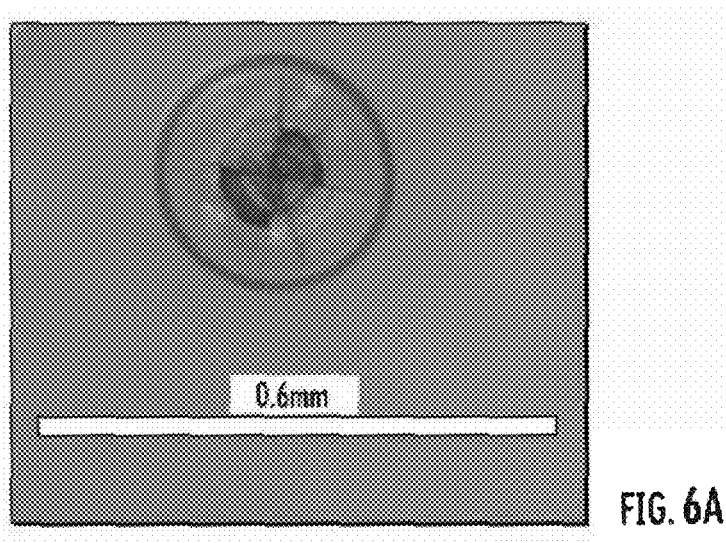
FIGS. 6A and 6B depicts results of a thermal shock test for the disclosed fusion formed borosilicate glass composition (FIG. 6A) and for a comparative soda-lime glass composition (FIG. 6B)
Figure 6B:
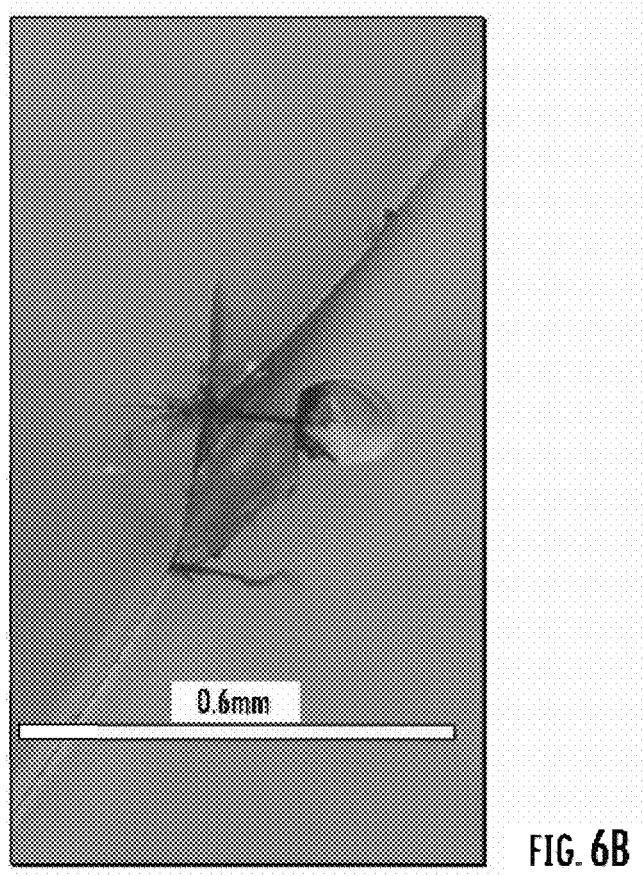

As was also mentioned above, glass plies formed from the presently disclosed borosilicate glass composition are more resistant to thermal shock than soda lime silicate glasses. The effect of a thermal shock load is shown in FIGS. 6A and 6B. In particular, specimens of the presently disclosed fusion formed glass composition (FIG. 6A) and soda lime glass (FIG. 6B) were indented with a Vickers indenter at 2 kgf as discussed above in relation to FIGS. 5A and 5B. The specimens were then heated up to 150° C., and a droplet of water (at 25° C.±5° C.) was dropped onto the indent site while the specimens were still hot. As can be seen in FIG. 6B, the soda-lime silicate glass cracks readily propagate during this thermal shock event. By comparison, the cracks in the fusion formed borosilicate glass composition remain confined within the ring crack boundary as shown in FIG. 6A. One reason for the resistance to thermal shock is the ring crack boundary that prevents radial crack extension. Another reason for the resistance to thermal shock is that the LTCTE for the fusion formed borosilicate glass composition is considerably lower than soda-lime silicate (5.6 ppm/° C. or less for the fusion formable borosilicate glass composition vs. 8.0 ppm/° C. for the soda-lime silicate).

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

According to an exemplary embodiment and in furtherance the above disclosed information, a vehicle windshield or other article may include a first ply (e.g., outer ply, glass sheet; see, e.g., ply first glass 310 of FIG. 3) comprising a first major surface (e.g., outside surface, front-facing surface) and a second major surface opposite to the first major surface, a second ply (e.g., outer ply, glass sheet; see, e.g., second glass ply 320) comprising a third major surface and a fourth major surface opposite to the third major surface, and an interlayer (see, e.g., interlayer 330) coupling the second major surface of the first ply to the third major surface of the second ply. In contemplated embodiments, any of the first, second, third, and/or fourth surfaces may be coated, such as with a functional layer, such as ultra-violet light reflective layer, hydrophobic layer, adhesive promoting layer, etc., as disclosed above.

In some embodiments, the second ply is a tempered soda lime glass. In other embodiments, the second ply is an ion-exchanged aluminoborosilicate glass. In still other embodiments, the second ply is a glass-ceramic. In some embodiments, the interlayer includes a polymer, such as polyvinyl butyral.

Referring to Tables 1-3, the low-temperature coefficient of thermal expansion of compositions disclosed herein may range from more than 4.4 ppm/° C. to less than 6.09 ppm/° C., such as from 4.5 ppm/° C. to 6 ppm/° C., to 5.8 ppm/° C., and/or 5.6 ppm/° C. As indicated, LTCTE is obtained by measuring expansion of the glass between the temperatures of 0° C. and 300° C., such as by thermomechanical analysis described in ASTM Test Method E831 (Ref 4). In other contemplated embodiments, glasses with unique fracture behavior disclosed herein may not have viscosity for fusion forming, the glasses may have lower, or higher LTCTEs. In some embodiments, LTCTE of compositions disclosed herein is less than 8.7 ppm/° C., which may be associated with soda lime glass, and/or greater than 3.25 ppm/° C., which may be associated with lower-CTE borosilicates. Accordingly, glasses disclosed herein may be less thermal shock resistant than some lower-CTE borosilicates, which may be counter-intuitive. However, Applicants have found a higher CTE (e.g., greater than 3.25 ppm/° C.) will result in higher surface compression after thermal reforming. Disadvantages associated with lower thermal shock resistance may be offset by the unique fracture mechanics of glasses disclosed herein, further discussed below. A result is that glasses disclosed herein are more thermal resistant than soda lime by having a lower LTCTE than 8.7 ppm/° C., and may also have improved for blunt impact performance over other borosilicates.

In some embodiments, the first ply has a thickness of at least 200 μm and no more than 1 cm, and/or thicknesses disclosed above, such as 0.1 mm to about 6 mm. In other contemplated embodiments, a first ply, single-ply, monolithic sheet, substrate, or other article of borosilicate glass as disclosed herein may have such thicknesses as disclosed above or other thicknesses, such as less than 200 μm and/or at least 20 μm, or at least 1 cm and/or less than 1 m, where thickness may be constant or generally constant over the article (e.g., glass sheet, ply), such as within 100 μm of an average thickness of the respective article, such as within 10 μm of an average thickness, or the thickness may vary over the article, such as with a glass container having a thicker lip or base.

According to an exemplary embodiment, the interlayer cushions the first ply with respect to the second ply, thereby mitigating communicating of cracks therebetween. In contemplated embodiments, the interlayer has a modulus of rigidity that is less than that of glass of the first and/or second ply, such as less than 0.7 thereof, such as less than 0.5 thereof.

According to an exemplary embodiment, the interlayer adheres to the first ply, thereby controlling loss of fragments from fracture of the first ply. In some embodiments, the interlayer is directly contacting the first ply. As discussed above, in some embodiments the interlayer adheres to the first ply, the second ply, and/or both, and couples the first and second plies. According to an exemplary embodiment, the second ply reinforces the first ply, stiffening the first ply to bending forces applied thereto. However, in other contemplated embodiments, the first ply may be independent of a second ply or interlayer, and may instead be a monolith, for example.

According to an exemplary embodiment, the first ply has curvature such that the second major surface is concavely curved, and the second ply has curvature such that the third major surface is convexly curved and fits together with the second major surface, as disclosed above such that the first major surface of first ply is configured as an outward-facing surface of glazing, such as laminate glazing, such as a windshield and configured to be outboard when installed on a vehicle.

According to an exemplary embodiment, the first ply includes a borosilicate glass composition, such as those disclosed herein. In terms of constituent oxides, the borosilicate glass composition of the first glass ply includes (i) $SiO_2$, $B_2O_3$, and/or $Al_2O_3$; and (ii) one or more alkali metal oxides (also called alkaline oxides; e.g., $Li_2O$, $Na_2O$, $K_2O$, $Rb_2O$, $Cs_2O$) and/or one or more divalent cation oxides (zinc oxide and/or alkaline earth metal oxides, also called alkaline earth oxides, such as MgO, CaO, SrO, BaO).

According to some embodiments, such as those exhibiting self-terminating crack loop behavior as disclosed herein, concentrations in mole percent on an oxide basis of $SiO_2$, $B_2O_3$, the one or more alkali metal oxides, and, when included in the composition, $Al_2O_3$ and the one or more divalent cation oxides, satisfy some (e.g., one or a combination of more than one) or all the relationships: (relationship 1) $SiO_2 \geq 72$ mol %, such as $SiO_2 \geq 72.0$, such as $SiO_2 \geq 73.0$, such as $SiO_2 \geq 74.0$, and/or $SiO_2 \leq 92$, such as $SiO_2 \leq 90$; (relationship 2) $B_2O_3 \geq 10$ mol %, such as $B_2O_3 \geq 10.0$, such as $B_2O_3 \geq 10.5$, and/or $B_2O_3 \leq 20$, such as $B_2O_3 \leq 18$; (relationship 3) $(R_2O+R'O) \geq Al_2O_3$, such as $(R_2O+R'O) \geq (Al_2O_3+1)$, such as $(R_2O+R'O) \geq (Al_2O_3+2)$, and/or (relationship 4) $0.80 \leq (1-[(2R_2O+2R'O)/(SiO_2+2Al_2O_3+2B_2O_3)]) \leq 0.93$, where $R_2O$ is the sum of the concentrations of the one or more alkali metal oxides and, when included in the borosilicate glass composition, R'O is the sum of the concentrations of the one or more divalent cation oxides. $R_2O$ may be the sum of $Li_2O$, $Na_2O$, $K_2O$, $Rb_2O$, $Cs_2O$ for example, and R'O may be the sum of MgO, CaO, SrO, BaO, ZnO for example.

Inventive glasses disclosed herein may include additional constituents. In some embodiments, the borosilicate glass composition may further include $P_2O_5$. Notably, if $P_2O_5$ is added to the glass, it should be treated as non-rotatable network former (u or v) when considering the relationship (4) such as $R_2O$ or R'O, where the relationships (3) and (4) may be modified as $(R_2O+R'O+P_2O_5) \geq Al_2O_3$, and $0.80 \leq (1-[(2R_2O+2R'O+2P_2O_5)/(SiO_2+2Al_2O_3+2B_2O_3)]) \leq 0.93$. Other minor chemical components, such as fining agent $SnO_2$, $Sb_2O_3$, NaCl, are generally negligible with respect to rotatability and fracture behavior. Other minor chemical components, such as color agent such as with which concentration smaller than 0.5 mol %, are negligible.

Applicants believe relationships (3) and (4) may relate to fracture behavior of borosilicate glass compositions disclosed herein and characterize aspects of "rotatability" of the respective compositions. For compositions of the form $xSiO_2 \cdot yAl_2O_3 \cdot zB_2O_3 \cdot uR_2O \cdot vRO$, where x, y, z, u, v can represent mol % or molar fraction of each type of oxide. If $(u+v) \geq y$, Applicants believe the fracture behavior is related to a rotatability parameter of $(1-[(2R_2O+2R'O)/(SiO_2+2Al_2O_3+2B_2O_3)])$. In instances when the value of the rotatability parameter is between 0.80 and 0.93, Applicant have found that Vickers indenter tests produce radial and lateral cracks that are contained within a small (<1 mm in diameter) crack loop. A result is that sheets of glasses within this range may not crack to failure during Vickers indenter tests, but instead only form small round cracks that contain other cracks and prevent them from spreading.

Similarly, Applicants believe density may relate to fracture behavior of the borosilicate glass compositions disclosed herein. According to an exemplary embodiment, density of the glass is greater than 2.230 g/cm³ and/or is less than 2.397 g/cm³, and this cracking behavior has been observed in this range.

Vickers indenter tests may be used to characterize fracture behavior of glass, as discussed in Gross et al., Crack-resistant glass with high shear band density, Journal of Non-Crystalline Solids, 494 (2018) 13-20; and Gross, Deformation and cracking behavior of glasses indented with diamond tips of various sharpness, Journal of Non-Crystalline Solids, 358 (2012) 3445-3452, both of which are incorporated by reference herein. In some embodiments, when glass having the borosilicate glass composition of the first glass ply is formed as at least ten polished, flat samples (e.g., 100 samples) of 1 mm thickness with a major surface of at least 2×2 cm² area (e.g., 2 cm by 2 cm square), and tested using square-based, 1360 four-sided, pyramidal Vickers indenter directed orthogonally into a center of the major surface at 25° C. in 50% relative humidity and the indenter is quasi-statically displaced at rate of 60 μm per second up to maximum 3 kg-force with indentation load held for 10 seconds (unless failure by fracture of the sample occurs first), more often than not (at least 51 times out of 100; at least 6 times out of 10) all cracks extending through the sample radially and/or laterally from beneath the indenter tip (i.e. the location where the indenter tip contacted the glass) are interrupted by a self-terminating crack loop (e.g., ring crack), whereby fracture of the samples from the Vickers indenter is limited to cracking within the loop. Essentially the indenter crushes and cracks the glass beneath the indenter. However, the crack loop forms and stops spread of cracking originating from the indenter contact beyond the crack loop. By contrast, lateral or radial cracks may otherwise form prior to and/or pass through such crack loops in other glasses (e.g., anomalous cracking) or crack loops may not form (e.g., normal cracking), and in either case the lateral or radial cracks would not be contained by the crack loop, and may propagate through the full glass article causing overall fracture through the article and failure thereof.

The following Table 100 summarizes the value of rotatability parameter of $(1-[(2R_2O+2R'O)/(SiO_2+2Al_2O_3+2B_2O_3)])$, density, and Vickers indention fracture behavior for various borosilicate glass compositions tested.

TABLE 100

| (broken into three parts to fit the page) | | | | | | | | |
|---|---|---|---|---|---|---|---|---|
| | | CE-101 | CE-102 | DSG | DSX | DQQ | DQR | DQS | DQT |
| $SiO_2$ | mol % | 77.18 | 78.97 | 76.42 | 76.38 | 75.35 | 76.72 | 76.14 | 75.18 |
| $Al_2O_3$ | mol % | 1.98 | 2.04 | 2.04 | 3.56 | 3.54 | 3.54 | 3.54 | 4.07 |
| $B_2O_3$ | mol % | 4.66 | 8.67 | 14.71 | 12.26 | 12.21 | 10.75 | 11.31 | 12.01 |
| $Na_2O$ | mol % | 16.14 | 10.28 | 6.8 | 4.87 | 4.6 | 4.67 | 4.68 | 4.61 |
| $K_2O$ | mol % | | | | 1.01 | 2.13 | 2.18 | 2.18 | 2.93 |
| MgO | mol % | | | | 1.81 | 0.99 | 0.99 | 0.99 | 0.02 |
| CaO | mol % | | | | 0 | 1.03 | 1.02 | 1.02 | 1.05 |
| $SnO_2$ | mol % | | | | 0.11 | 0.14 | 0.13 | 0.13 | 0.13 |
| density | g/cm³ | 2.428 | 2.397 | 2.275 | 2.273 | 2.307 | 2.308 | 2.308 | 2.316 |
| Rotatability value | | 0.64 | 0.8 | 0.88 | 0.86 | 0.84 | 0.83 | 0.83 | 0.84 |
| Fracture behavior | | normal | normal | contained | contained | contained | contained | contained | contained |
| | | DQU | DQV | DSP | DSQ | DSR | DSS | DST | DSU |
| $SiO_2$ | mol % | 77.19 | 76.36 | 76.34 | 76.06 | 76.15 | 76.19 | 76.23 | 76.09 |
| $Al_2O_3$ | mol % | 4.04 | 4.07 | 3.56 | 3.54 | 3.54 | 3.55 | 3.55 | 3.54 |
| $B_2O_3$ | mol % | 9.84 | 10.86 | 11.8 | 12.43 | 12.89 | 13.35 | 13.73 | 14.28 |
| $Na_2O$ | mol % | 4.7 | 4.57 | 4.29 | 4.15 | 3.85 | 3.55 | 3.33 | 3.12 |
| $K_2O$ | mol % | 3.05 | 2.94 | 1.96 | 1.95 | 1.8 | 1.65 | 1.58 | 1.51 |

TABLE 100-continued (broken into three parts to fit the page)

| | | | | | | | | | |
|---|---|---|---|---|---|---|---|---|---|
| MgO | mol % | 0.02 | 0.02 | 0.95 | 0.86 | 0.82 | 0.77 | 0.71 | 0.66 |
| CaO | mol % | 1.03 | 1.03 | 0.99 | 0.9 | 0.86 | 0.82 | 0.76 | 0.7 |
| SnO$_2$ | mol % | 0.13 | 0.14 | 0.1 | 0.1 | 0.1 | 0.1 | 0.1 | 0.1 |
| density | g/cm$^3$ | 2.335 | 2.324 | 2.298 | 2.285 | 2.271 | 2.259 | 2.246 | 2.234 |
| Rotatability value | | 0.83 | 0.84 | 0.85 | 0.85 | 0.87 | 0.88 | 0.88 | 0.89 |
| Fracture behavior | | contained | contained | contained | contained | contained | contained | contained | contained |

| | | DSV | DSW | DSX | DSY | DSZ | DUE | CE-103 | CE-104 |
|---|---|---|---|---|---|---|---|---|---|
| SiO$_2$ | mol % | 75.91 | 76.14 | 76.35 | 76.04 | 76.03 | 74.89 | 75.54 | 83.6 |
| Al$_2$O$_3$ | mol % | 3.53 | 3.54 | 3.56 | 3.54 | 3.54 | 3.5 | 2.01 | 1.2 |
| B$_2$O$_3$ | mol % | 12.63 | 12.31 | 12.26 | 12.4 | 12.37 | 13.6 | 19.76 | 11.6 |
| Na$_2$O | mol % | 4.98 | 6.09 | 4.87 | 4.97 | 6.13 | 5.22 | 2.66 | 3 |
| K$_2$O | mol % | 1.05 | 0 | 1.01 | 1.05 | 0 | 0.92 | | 0.7 |
| MgO | mol % | 0.86 | 0.87 | 1.81 | 0.03 | 1.78 | 1.76 | | |
| CaO | mol % | 0.9 | 0.91 | 0.02 | 1.83 | 0.02 | | | |
| SnO$_2$ | mol % | 0.11 | 0.11 | 0.11 | 0.11 | 0.1 | 0.11 | | |
| density | g/cm$^3$ | 2.286 | 2.284 | 2.273 | 2.295 | 2.273 | 2.273 | 2.147 | 2.23 |
| Rotatability value | | 0.86 | 0.85 | 0.86 | 0.85 | 0.85 | 0.86 | 0.96 | 0.93 |
| Fracture behavior | | contained | contained | contained | contained | contained | contained | anomalous | anomalous |

In Table 100, for some compositions the fracture behavior is identified as "contained" as opposed to "anomalous" or "normal" facture behavior. Radial and lateral cracks that were contained in a crack loop (e.g., circular ring crack) did not extend beyond the crack loop, even hours after indention testing (e.g., 12 hours, 24 hours, 72 hours after). As such samples with the contained cracks only cracked locally, within the crack loop, and did not fail beyond the crack loop. As summarized in Table 100, Applicant observed polished, flat samples of 1 mm to 3.3 mm thickness tested using square-based, 1360 four-sided, pyramidal Vickers indenter quasi-statically displaced at rate of 60 µm per second until fracture or up to maximum 3 kg-force with indentation load held for 10 seconds. Furthermore, as evidence that the radial and lateral cracks were contained, when rapidly cooled by placement of corresponding samples into cold water, cracks did not propagate beyond the crack loop and the observed samples did not fail outside the crack loop. Radial and lateral cracks that were contained in a crack loop, with the samples rapidly cooled, did not extend beyond the crack loop, even hours after indention testing (e.g., 2 hours, 12 hours, 24 hours, 72 hours after).

For the composition labelled DUE in Table 100, crack loops were observed to be shaped as circular rings or ring cracks (see generally FIGS. 5A & 6A). When loaded to 2 kg-force, the radii of the rings ranged from 101 to 136 micrometers. When loaded to 3 kg-force, the radii of the rings ranged from 119 to 229 micrometers.

Also, for the composition labelled DUE in Table 100, 19 different indent tests were performed for samples with a thickness of 1 mm, and the result was 19 of the 19 tests had circular ring cracks that contained the radial and lateral cracks from the indenter. Applicants expect similar results with more testing, such as at least 90 out of 100 samples, such as at least 95, such as at least 98.

Applicants observed that for some samples, cracks may be delayed but show up within approximately 2 hours of indentation testing. But, radial and lateral cracks of the DUE samples were contained in a crack loop and did not extend beyond the crack loop, even hours after indention testing (e.g., 2 hours, 12 hours, 24 hours, 72 hours after).

For the composition labelled DQS in Table 100, ten different indent tests were performed for samples with a thickness of 1 mm, and the results were 10 out of 10 samples produced crack loops in the form of circular ring cracks that contained the radial and lateral cracks from the indenter. The radial and lateral cracks did not extend beyond the crack loop, even hours after indention testing (e.g., 2 hours, 12 hours, 24 hours, 72 hours after). Applicants expect similar results with more testing, such as at least 90 out of 100 samples, such as at least 95, such as at least 98.

The same DQS composition was tested in samples with a thickness of 3.3 mm, and 16 of 20 different tests resulted in circular ring cracks that contained the radial and lateral cracks from the indenter. Applicants expect similar results with more testing, such as at least 50 out of 100 samples, such as at least 60, such as at least 75. Without being bound to any theory, Applicants believe that the decreased percentage of occurrence with 3.3 mm samples may have been due to inhomogeneity of the samples, rather than thickness.

For samples of DSX composition in Table 100, 21 different indent tests were performed for samples with a thickness of 1 mm, and the results were 19 with circular ring cracks that contained the radial and lateral cracks from the indenter. Applicants expect similar results with more testing, such as at least 70 out of 100 samples, such as at least 80, such as at least 90. Those radial and lateral cracks did not extend beyond the crack loop, even hours after indention testing (e.g., 2 hours, 12 hours, 24 hours, 72 hours after).

Figure 14:
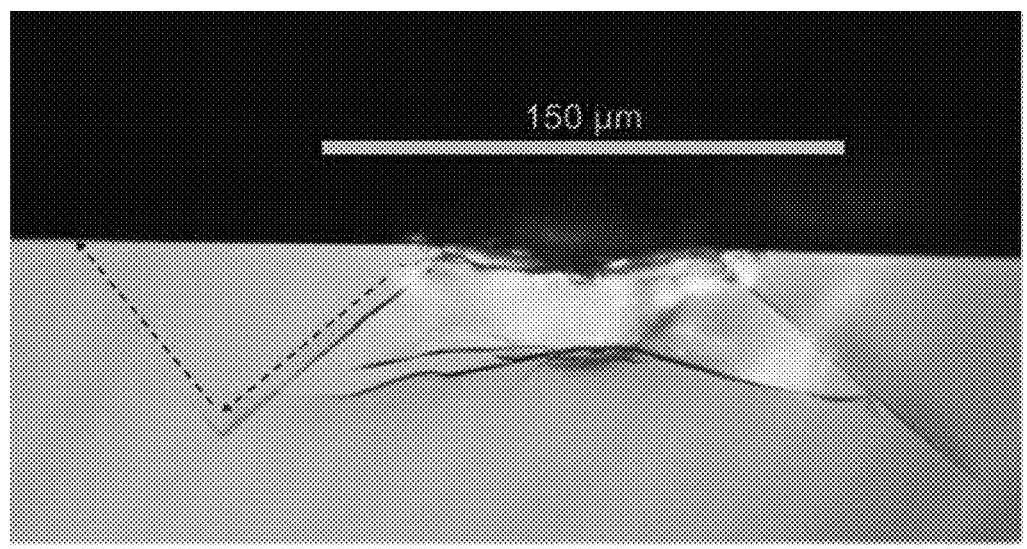
FIG. 14 is a digital image of a glass article in cross-section, according to exemplary embodiments.

As shown in FIG. 14, Applicants were able to observe a cross-section of a sample of borosilicate glass, as disclosed herein, and view cracking of the sample via fractography. The image shows cracking of a normal cone beneath the indent location that appears to then change direction and head back to the same surface, presumably to form the crack loop. Further, the crack cone keeps extending through the sample to the opposing surface. Applicants believe this to be newly discovered fracture behavior for the presently disclosed glasses and structures.

In contemplated embodiments, a glass article (e.g. sheet, ply, film, cover, tube, container) of borosilicate glass, as disclosed herein, includes one or more crack loops, as disclosed above, such as having a generally round perimeter, such as a circular perimeter. The crack loops may be particularly small, such as having a cross-sectional dimension in a direction along a surface of the glass article that is less than 10 mm, such as less than 2 mm, such as less than 1 mm, such as less than 0.7 mm (as shown in FIG. 6A for example), and/or at least 10 µm, such as at least 50 µm, such as at least 100 µm, such as at least 200 µm.

Thickness of the article, uniformity of the dimensions of the article, rate of loading, composition and microstructure of the borosilicate glass, support underlying the article, geometry of the indenter, or other parameters may influence fracture behavior. For example, Applicants demonstrated different size crack loops with the DUE composition resulting from different loading, as discussed above.

If the cone extends to the opposing surface and the crack loop intersects the cone, as shown in FIG. 14, then the ring crack in combination with the cone may form a crack-enclosed section of the article that passes fully through the article. At least portions of the crack-enclosed section may have a round periphery, such as at surfaces of the article. The crack enclosed section may generally have a cone shape, an hourglass shape, or another shape. Due to unique fracture behavior of borosilicate glasses disclosed herein, purposeful mechanical fracturing of the glass articles may be used to form holes or other precise geometries, such as surface dimples where a cone does not extend fully through the article. Etchants, lasers, plasma, heat, etc., may be used to further process the articles, such as to arrest cracks, dull sharp edges associated with the cracking.

In contemplated embodiments, an article may have at least one crack loop and/or associated structure (e.g., hole) as disclosed above, or the article may have more than one of the crack loops, such as at least 10, at least 100, at least 1000 crack loops, which may connect with cones to pass fully through such articles to form holes, when (fractured) glass interior to the crack loop is removed, such as mechanically or by chemical etchants. Such articles may be useful as a sieve, a mesh, a panel, a substrate or component in a battery or electronic device for example. Lines of small crack loops in series (e.g., perforation line) may aid in controlled separation of sheets or shapes through guided fracture between the loops. Holes formed in the article may allow for breathability of the article, and/or for liquids, adhesives, polymers in fluid-state, conductive metals, etc. to pass through the article. The loops cracks may be arranged in a pattern or in patterns on the article. In some contemplated embodiments, such as with articles (e.g., sheets) having more than one crack loop, the crack loops may vary in size, such as where one crack loop has a diameter that is at least 20% greater than another crack loop in the same article.

Controlled cracking of an article, such as a sheet of borosilicate glass as disclosed herein, may differ from use of lasers to crack a glass sheet to form a via or other hole or feature because the crack loops disclosed herein may be a single continuous crack ring, as opposed to numerous smaller cracks extending in various directions. The crack loop may be unlikely to propagate beyond the loop, as demonstrated by the testing disclosed herein. In some embodiments, articles that include one or more crack loops or associated structures may not require or may require fewer etchants or other means to dull edges or microcracking.

With that said, some inventive glasses disclosed herein may have conventional fracture behavior, such as glasses that are borosilicate glasses that are able to be fusion formed but have normal or anomalous cracking in Vickers indention testing as disclosed herein. And vice versa, some inventive glasses disclosed herein may have unique crack loop fracture behavior, such as glasses that are borosilicate glasses but may be more difficult to fusion form. Still other embodiments may have the unique fracture behavior and fusion formability, thereby providing glasses that are particularly advantageous for outer plies in laminate windshields or in other articles disclosed herein.

Each of U.S. Application No. 63/023,518 filed May 12, 2020, Ser. No. 17/327,870 filed May 24, 2021, 63/088,525 filed Oct. 7, 2020, Ser. No. 17/068,272 filed Oct. 12, 2020, 63/136,381 filed Jan. 12, 2021, 63/151,210 filed Feb. 19, 2021, 63/177,536 filed Apr. 21, 2021, 63/209,489 filed May 11, 2021 is incorporated by reference herein in its entirety. U.S. Application No. 63/059,105 filed Jul. 30, 2020 is incorporated by reference herein in its entirety. U.S. Application No. 63/050,181 filed Jul. 10, 2020 is incorporated by reference herein in its entirety.

Construction and arrangements of the compositions, assemblies, and structures, as shown in the various exemplary embodiments, are illustrative only. Although only a few embodiments have been described in detail in this disclosure, many modifications are possible (e.g., variations in sizes, dimensions, structures, shapes, and proportions of the various elements, values of parameters, mounting arrangements, use of materials, colors, orientations) without materially departing from the novel teachings and advantages of the subject matter described herein. Materials, such as the glazing disclosed herein, may be used for glazing in architectural applications (e.g., windows, partitions) or may be otherwise used, such as in packaging (e.g., containers). The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present inventive technology.

What is claimed is:

1. An article comprising:
    an outer ply comprising a borosilicate glass and having a thickness of at least 200 μm and no more than 1 cm,
    wherein in terms of constituent oxides, composition of the borosilicate glass comprises: $SiO_2$, $B_2O_3$, $Al_2O_3$, one or more alkali metal oxides, one or more divalent cation oxides selected from the group consisting of MgO, CaO, SrO, BaO, and ZnO,
    greater than or equal to 11 mol % and less than or equal to 16 mol % $B_2O_3$,
    greater than or equal to 0.03 mol % and less than or equal to 0.5 mol % $Fe_2O_3$,
    greater than or equal to 2 mol % and less than or equal to 6 mol % $Al_2O_3$, and
    a total amount of $Na_2O$, $K_2O$, MgO, and CaO that is greater than or equal to 7.0 mol %,
    wherein the borosilicate glass comprises an annealing point that is greater than or equal to 520° and less than or equal to 590°,
    wherein concentrations in mole percent on an oxide basis of $SiO_2$, $B_2O_3$, the one or more alkali metal oxides, $Al_2O_3$, and the one or more alkaline earth metal oxides, satisfy the relationships:

$$(R_2O+R'O) \geq Al_2O_3,$$

$$0.80 < (1-[(2R_2O+2R'O)/(SiO_2+2Al_2O_3+2B_2O_3)]) < 0.93,$$

where $R_2O$ is the sum of the concentrations of the one or more alkali metal oxides and $R'O$ is the sum of the concentrations of the one or more alkaline earth metal oxides;
    an inner ply comprising a second glass that is different from the composition of the borosilicate glass of the outer ply, wherein the inner ply reinforces the outer ply, stiffening the outer ply to bending forces applied thereto, and wherein composition of the second glass is selected from the group consisting of a soda lime silicate glass composition, an aluminosilicate glass composition, an alkali aluminosilicate glass composition, an alkali containing borosilicate glass composition, an alkali aluminophosphosilicate glass composition, and an alkali aluminoborosilicate glass composition;

an interlayer coupling the inner and outer plies, wherein the interlayer is polymeric and dampens transmission of cracks from the outer ply to the inner ply.

2. The article of claim 1, wherein when glass having the composition of the borosilicate glass of the outer ply is formed as 100 polished, flat samples of 1 mm thickness with a major surface of 2×2 cm$^2$ area, and tested using square-based, 136° four-sided, pyramidal Vickers indenter directed orthogonally into a center of the major surface at 25° C. in 50% relative humidity and the indenter is quasi-statically displaced at rate of 60 μm per second to maximum 3 kg-force with indentation load held for 10 seconds, more often than not all cracks extending through the samples radially and/or laterally from the indenter are contained within a crack loop.

3. The article of claim 2, wherein when rapidly cooled from 25° C. to 1° C. by placement of the samples into cold water, more often than not cracks extending through the samples radially and/or laterally do not propagate beyond the crack loop.

4. The article of claim 2, wherein most of the crack loops of the samples are circular and have radii less than 1 mm.

5. The article of claim 1, wherein the borosilicate glass of the outer ply comprises at least 74 mol % SiO$_2$; and wherein the borosilicate glass of the outer ply comprises a sum of SiO$_2$, B$_2$O$_3$, and Al$_2$O$_3$ is at least 90 mol %.

6. The article of claim 1, wherein the outer ply is thicker than the inner ply, and wherein the second glass of the inner ply is chemically strengthened through an ion-exchange treatment.

7. The article of claim 6, wherein the thickness of the outer ply is a first thickness, wherein the first thickness is at least 2 mm, and wherein the inner ply has a second thickness of less than 2 mm.

8. The article of claim 7, wherein a ratio of the first thickness to the sum of the first and second thicknesses is at least 0.7.

9. The article of claim 7, wherein the first thickness is at least 3.3 mm and the second thickness is 0.7 mm or less.

10. The article of claim 1, wherein visible transmission through the article, as measured according to ISO 13837A, is at least 73%; and wherein total solar transmittance through the article, as measured according to ISO 13837A, is 90% or less.

11. The article of claim 1, wherein the outer ply and the inner ply are pair-shaped, wherein the outer ply comprises a first curvature depth of at least 2 mm, wherein the inner ply comprises a second curvature depth of at least 2 mm, and wherein the first curvature depth is within 10% of the second curvature depth.

12. The article of claim 1, wherein the outer ply comprises a curvature depth of at least 2 mm, and wherein the inner ply has stress from being cold-formed into conformity with the outer ply.

13. The article of claim 1, wherein glass having the borosilicate glass composition of the outer ply has a liquidus viscosity greater than or equal to 500 kilopoise, and wherein glass having the borosilicate glass composition of the outer ply has a 200-poise temperature less than or equal to 1725° C.

14. The article of claim 1, wherein when the article is installed in a vehicle, the outer ply is configured to be outboard of the inner ply.

15. The article of claim 1, wherein transmission of ultraviolet light having a wavelength in a range of 300-380 nm through the article is 75% or less; wherein transmission of light in the visible spectrum through the article is 73% or more; and wherein total solar transmission through the article is 61% or less.

16. The article of claim 1, wherein the borosilicate glass has a low-temperature coefficient of thermal expansion greater than 3.25 ppm/° C. and less than 8.7 ppm/° C.

17. An article comprising:
an outer ply comprising a borosilicate glass and having a thickness of at least 200 μm and no more than 1 cm, wherein in terms of constituent oxides, composition of the borosilicate glass comprises: SiO$_2$, B$_2$O$_3$, Al$_2$O$_3$, one or more alkali metal oxides, and one or more divalent cation oxides selected from the group consisting of MgO, CaO, SrO, BaO, and ZnO;
at least 74 mol % SiO$_2$;
greater than or equal to 11 mol % and less than or equal 16 mol % B$_2$O$_3$;
greater than or equal to 2 mol % and less than or equal to 6 mol % Al$_2$O$_3$;
a total amount of Na$_2$O, K$_2$O, CaO, and MgO that is greater than or equal to 7.0 mol %; and
greater than or equal to 0.03 mol % and less than or equal to 0.5 mol % Fe$_2$O$_3$;
wherein the borosilicate glass comprises an annealing point that is greater than or equal to 520° and less than or equal to 590°;
wherein a sum of SiO$_2$, B$_2$O$_3$, and Al$_2$O$_3$ is at least 90 mol %; and
wherein concentrations in mole percent on an oxide basis of SiO$_2$, B$_2$O$_3$, the one or more alkali metal oxides, Al$_2$O$_3$, and the one or more alkaline earth metal oxides, satisfy the relationships:

$$(R_2O+R'O) \geq Al_2O_3$$

$$0.80<(1-[(2R_2O+2R'O)/(SiO_2+2Al_2O_3+2B_2O_3)]) <0.93,$$

where R$_2$O is the sum of the concentrations of the one or more alkali metal oxides and R'O is the sum of the concentrations of the one or more alkaline earth metal oxides; and an inner ply comprising a second glass that is different from the composition of the borosilicate glass of the outer ply, wherein the inner ply reinforces the outer ply, stiffening the outer ply to bending forces applied thereto, wherein composition of the second glass is selected from the group consisting of a soda lime silicate glass composition, an aluminosilicate glass composition, an alkali aluminosilicate glass composition, an alkali containing borosilicate glass composition, an alkali aluminophosphosilicate glass composition, and an alkali aluminoborosilicate glass composition; and an interlayer coupling the inner and outer plies, wherein the interlayer is polymeric and dampens transmission of cracks from the outer ply to the inner ply, wherein the interlayer has a thickness in a range from 0.5 mm to 2.5 mm, wherein the outer ply and the inner ply are pair-shaped, wherein the outer ply comprises a first curvature depth of at least 2 mm, wherein the inner ply comprises a second curvature depth of at least 2 mm, and wherein the first curvature depth is within 10% of the second curvature depth.

18. The article of claim 1, wherein the thickness is greater than or equal to 2.0 mm.

19. The article of claim 1, wherein the composition of the borosilicate glass comprises greater than or equal to 4 mol % and less than or equal to 6 mol % $Na_2O$.

20. The article of claim 19, wherein the composition of the borosilicate glass comprises:
greater than or equal to 3 mol % and less than or equal to 5 mol % $Al_2O_3$; and
greater than or equal to 12 mol % and less than or equal to 16 mol % $B_2O_3$.

21. The article of claim 1, wherein the outer glass ply consists of the borosilicate glass.

22. The article of claim 1, wherein the composition of the borosilicate glass comprises greater than or equal to 74.0 mol % $SiO_2$.

\* \* \* \* \*